(12) United States Patent
Pedrycz et al.

(10) Patent No.: US 10,884,151 B2
(45) Date of Patent: Jan. 5, 2021

(54) ULTRASONIC CUTTING DETECTION

(71) Applicant: Schlumberger Technology Corporation, Sugar Land, TX (US)

(72) Inventors: Adam Pedrycz, Kanagawa-ken (JP); Hiroshi Hori, Kanagawa-ken (JP); Jean-Christophe Auchere, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 398 days.

(21) Appl. No.: 15/877,263

(22) Filed: Jan. 22, 2018

(65) Prior Publication Data

US 2019/0226323 A1 Jul. 25, 2019

(51) Int. Cl.
| | | |
|---|---|---|
| *G01V 1/50* | (2006.01) | |
| *G01V 1/48* | (2006.01) | |
| *E21B 47/095* | (2012.01) | |

(52) U.S. Cl.
CPC .............. *G01V 1/50* (2013.01); *E21B 47/095* (2020.05); *G01V 1/48* (2013.01)

(58) Field of Classification Search
CPC .......... G01V 1/50; G01V 1/48; E21B 47/091; E21B 47/095
See application file for complete search history.

(56) References Cited

U.S. PATENT DOCUMENTS

| | | | | |
|---|---|---|---|---|
| 5,130,950 A | * | 7/1992 | Orban | E21B 47/082 367/34 |
| 5,214,251 A | * | 5/1993 | Orban | E21B 21/08 181/102 |
| 5,250,806 A | * | 10/1993 | Rhein-Knudsen | E21B 17/1078 250/254 |
| 6,206,108 B1 | | 3/2001 | MacDonald et al. | |
| 6,768,106 B2 | | 7/2004 | Gzara et al. | |
| 2009/0145661 A1 | | 6/2009 | Jeffryes et al. | |
| 2011/0069583 A1 | | 3/2011 | Camwell et al. | |
| 2012/0069705 A1 | | 3/2012 | Zhao | |
| 2014/0278113 A1 | | 9/2014 | Chok et al. | |
| 2016/0108724 A1 | | 4/2016 | Jarrot | |
| 2018/0363450 A1 | | 12/2018 | Legendre et al. | |

FOREIGN PATENT DOCUMENTS

| | | | | |
|---|---|---|---|---|
| EP | 0671547 A1 | * | 9/1995 | ............ G01N 29/28 |
| WO | 9900575 | | 1/1999 | |
| WO | 2009072091 | | 6/2009 | |
| WO | 2017106808 | | 6/2017 | |

OTHER PUBLICATIONS

International Search Report and Written Opinion issued in International Patent application PCT/EP2016/002105, dated Mar. 31, 2017. 13 pages.
Extended Search Report Rule 62 EPC issued in European patent application 15290319.1 dated Jun. 13, 2016. 7 pages.

* cited by examiner

*Primary Examiner* — Ian J Lobo

(57) ABSTRACT

Apparatus and methods for identifying drilling cuttings downhole by extracting an echo from a pulse-echo waveform acquired utilizing a downhole ultrasonic tool having an acoustic device. An energy before echo profile preceding the extracted echo is determined, and then the energy before echo profile is processed to remove effects associated with the acoustic device. A cutting is then identified from the processed energy before echo profile.

19 Claims, 17 Drawing Sheets

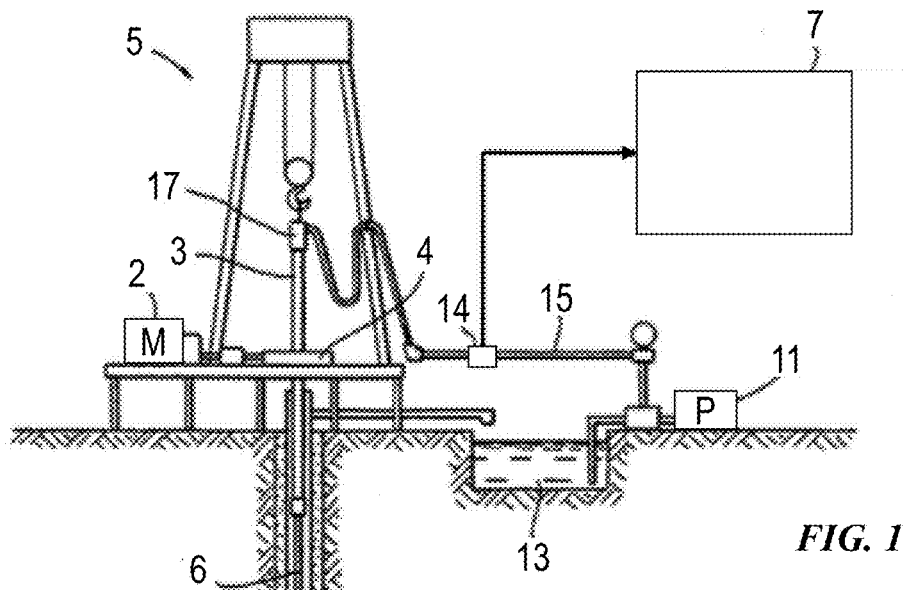
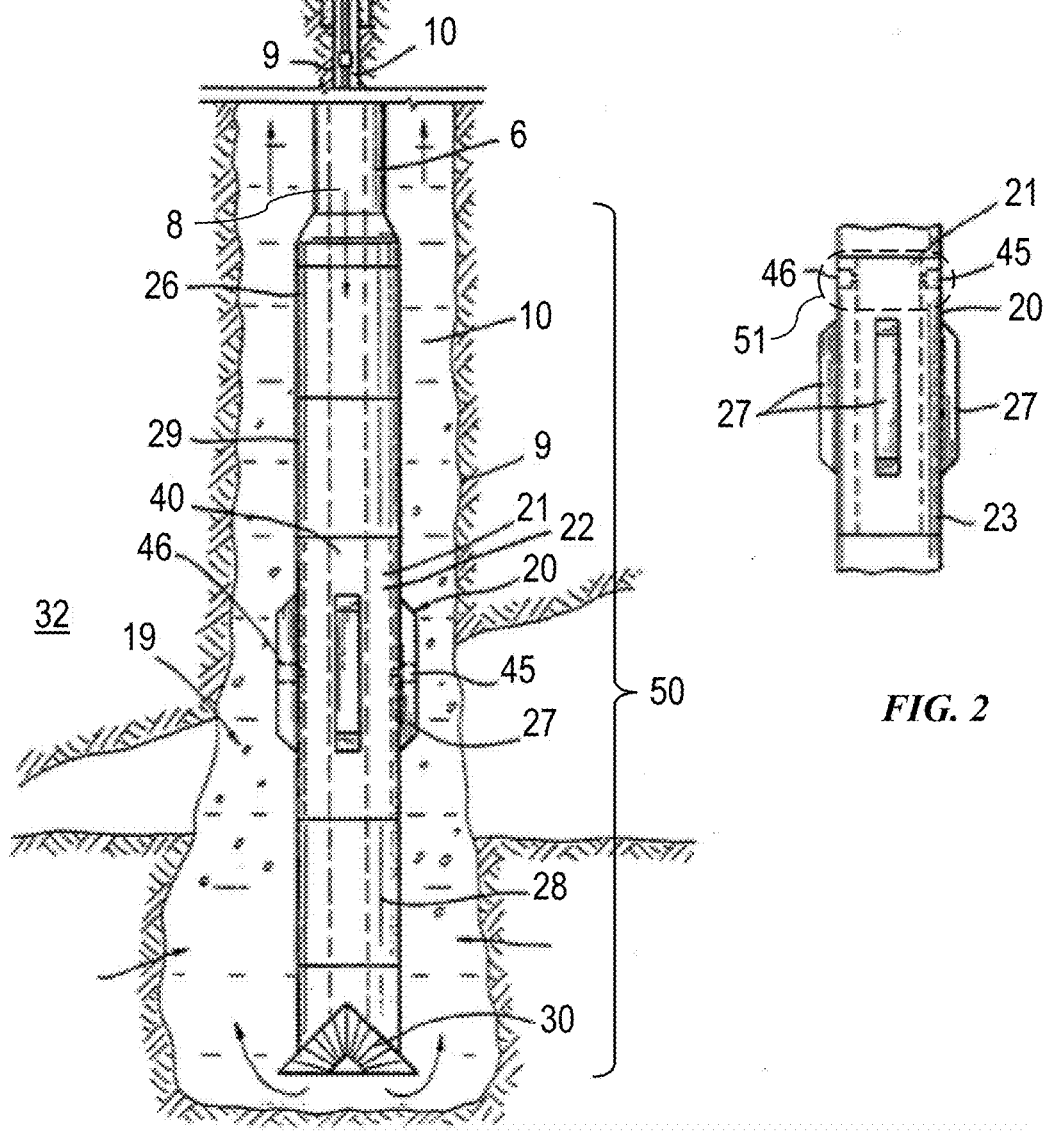
FIG. 1
FIG. 2

(INCR. →)　　ACQUISITION NUMBER (INCR. →)　　ACQUISITION NUMBER

ULTRASONIC CUTTING DETECTION

BACKGROUND OF THE DISCLOSURE

Cuttings are produced as a byproduct when drilling an oil/gas well into a subterranean formation. The cuttings can vary in size, shape, volume, and other properties. Such properties depend upon the type of the subterranean formation, the drill bit, the drilling mechanics, and other factors. Thus, the characterization of cuttings can provide information about the drilling process, the subterranean formation, and/or other topics.

Cutting information can be coarsely obtained via physical analysis of drilling fluid circulated back to surface. Such information may include or indicate the volume and intensity of the cuttings, which may signal the downhole cutting removal, and which are parameters monitored for of safe drilling and to avoid drilling problems, such as bit balling, pack-off, and stuck pipe. However, the physical analysis of drilling fluid and cuttings at surface includes an inherent delay while waiting for the drilling fluid to return the cuttings to surface for analysis.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including extracting an echo from an ultrasonic waveform. The waveform was acquired utilizing a downhole ultrasonic tool having an acoustic device and operated within a wellbore extending into a subterranean formation. The method also includes determining for the ultrasonic waveform an energy before echo profile preceding the extracted echo. The energy before echo profile is processed to remove effects associated with the acoustic device. A cutting is identified from the processed energy before echo profile.

The present disclosure also introduces a system including a downhole ultrasonic tool and a processing device. The downhole ultrasonic tool has an acoustic device and is operable within a wellbore to acquire an ultrasonic waveform. The processing device includes a processor and a memory storing an executable code. The processing device is operable for extracting an echo from the acquired waveform, determining for the ultrasonic waveform an energy before echo profile preceding the extracted echo, processing the energy before echo profile to remove effects associated with the acoustic device, and identifying a cutting from the processed energy before echo profile.

The present disclosure also introduces a tangible, non-transient, computer-readable medium including instructions executable by a processor to extract an echo from an ultrasonic waveform. The waveform was acquired utilizing a downhole ultrasonic tool having an acoustic device and operated within a wellbore extending into a subterranean formation. The instructions are also for determining for the ultrasonic waveform an energy before echo profile preceding the extracted echo, processing the energy before echo profile to remove effects associated with the acoustic device, and identifying a cutting from the processed energy before echo profile.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 is a schematic view of at least a portion of an example implementation of apparatus according to one or more aspects of the present disclosure.

FIG. 2 is a schematic view of a portion of another example implementation of the apparatus shown in FIG. 1.

FIGS. 3-1 and 3-2 are schematic views of an example implementation of the transducer mounting section shown in FIG. 2.

FIGS. 3-3 and 3-4 are schematic views of another example implementation of the transducer mounting section shown in FIG. 2.

FIGS. 4-1 and 4-2 are schematic views of another example implementation of the transducer mounting section shown in FIG. 2.

FIGS. 5-1 and 5-2 are schematic views of another example implementation of the transducer mounting section shown in FIG. 2.

DETAILED DESCRIPTION

Figures 1, 3:
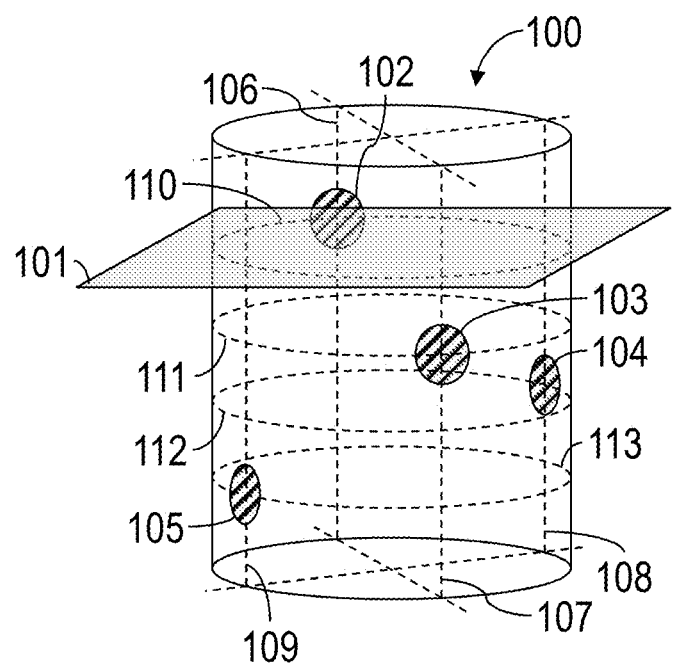

It is to be understood that the following disclosure provides many different examples for different features and other aspects of various implementations. Specific examples of components and arrangements are described below to simplify the present disclosure. These are merely examples, and are not intended to be limiting. In addition, the present disclosure may repeat reference numerals and/or letters in the various examples. This repetition is for simplicity and clarity, and does not in itself dictate a relationship between the various implementations described below.

While-drilling characterization of cuttings according to one or more aspects of the present disclosure is an advantageous answer product from several perspectives. For example, cutting information is conventionally obtained via physical analysis of the drilling fluid circulating from downhole to surface, but such approach comes with an inherent delay while the drilling fluid and entrained cuttings travel to surface. However, one or more aspects of the present disclosure permit "real-time" while-drilling indications of the existence, volume, intensity, and/or other characteristics of the cuttings, which can signal the potential of borehole degradation (e.g., in terms of collapse), downhole tool sticking, and/or even more severe outcomes, and it is beneficial to have such knowledge as quickly as possible. Furthermore, the cuttings characteristics obtained in real-time according to one or more aspects of the present disclosure can be used in post-processing to improve the robustness and quality of the deliverable answer products effected by and/or otherwise related to cuttings. In some implementations within the scope of the present disclosure, it may be possible for the real-time cuttings indications introduced herein to be obtained by making use of existing tools and/or data, such as those employed in ultrasonic imaging operations.

FIG. 1 is a schematic view of at least a portion of an example implementation of a rotary drilling rig system 5 according to one or more aspects of the present disclosure. Downhole measurements are conducted by instruments disposed in a drill collar 20. Such measurements may be stored in memory apparatus of the downhole instruments, or may be telemetered to the surface via measurement-while-drilling (MWD) telemetering apparatus and techniques. For example, an MWD telemetry tool 29 may receive signals from the instruments of the collar 20, and may transmit the signals via a mud path 8 of a drill string 6 for receipt, ultimately, via a pressure sensor 14 in a stand pipe 15 and/or other surface instrumentation 7.

The drilling rig 5 includes a motor 2 that turns a kelly 3 by means of a rotary table 4. The drill string 6 includes sections of drill pipe connected end-to-end to the kelly 3 and turned thereby. For example, a plurality of drill collars and/or tools 20, 26, 28, and 29 are attached to the drill string 6. Such collars and tools collectively form a bottom-hole assembly (BHA) 50 between the drill string 6 and a drill bit 30.

As the drill string 6 and the BHA 50 turn, the drill bit 30 bores a wellbore 9. An annulus 10 is thus defined between the outside of the drill string 6 (including the BHA 50) and the wellbore 9 through one or more subterranean formations 32.

A pump 11 pumps drilling fluid or "mud" from a mud pit 13 through a stand pipe 15, a revolving injector head 17, and the mud path 8 of the kelly 3 and the drill string 6 to the bit 30. The mud lubricates the drill bit 30 and carries cuttings upward to the surface via the annulus 10. The mud is returned to the mud pit 13, where it may be separated from cuttings and the like, degassed, and returned for application again to the drill string.

The tool 20 may be a downhole ultrasonic tool 20 according to one or more aspects of the present disclosure. For example, the ultrasonic tool 20 may include at least one ultrasonic transducer 45, and perhaps a second ultrasonic transducer 46 placed diametrically opposed from the ultrasonic transducer 45, such as for measuring characteristics of the wellbore 9 and/or fluid therein during drilling operations. Such measurements may be conducted while the wellbore 9 is being drilled, and/or with the drill string 6 and the BHA 50 in the wellbore 9 while the bit 30, the BHA 50, and the drill string 6 are not rotating. Such measurements may be conducted while the drill string 6, the BHA 50, and the bit 30 are being tripped to and from the bottom of the wellbore 9. The measurements (or data based at least partially thereon) may be telemetered to the surface via the MWD telemetry tool 29 and the internal mud passage 8 of the drill string 6 (or the annulus 10), or they may be recorded and stored downhole and for retrieval at the surface after the drill string 6 and BHA 50 have been removed from the wellbore 9.

Figures 2, 3:
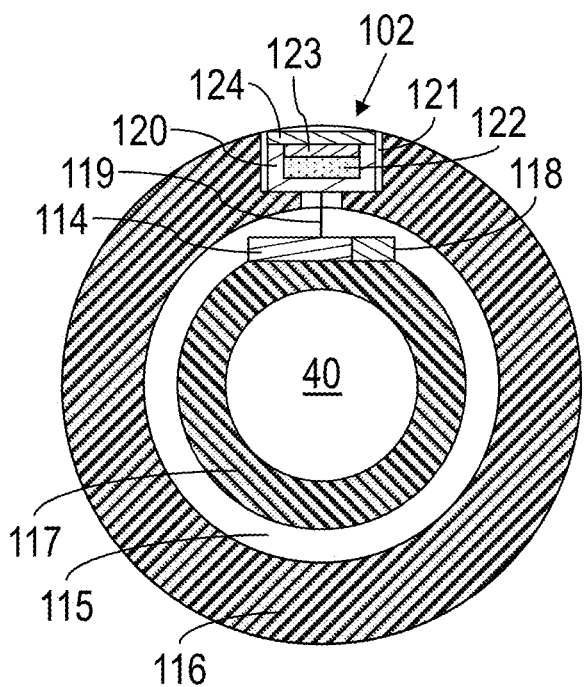
Figure 3:
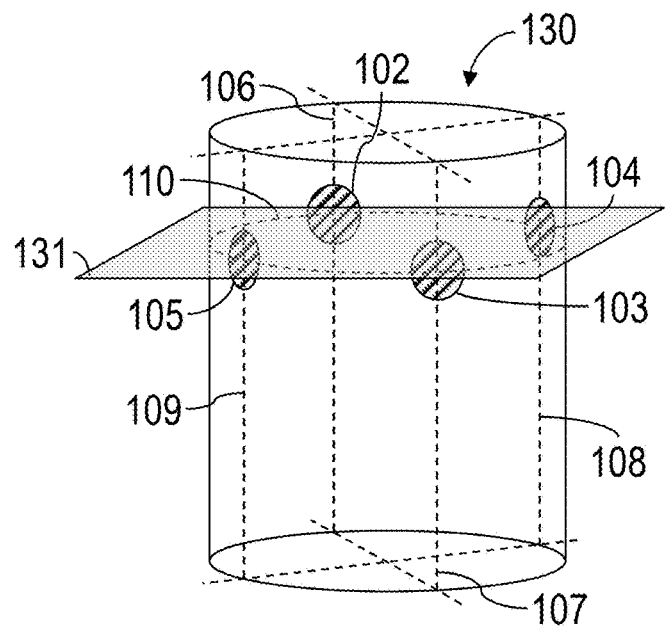

The transducers 45, 46 may be mounted on stabilizer fins 27 of the ultrasonic tool 20, as depicted in FIG. 1, or may be mounted in a cylindrical wall 23 within a transducer mounting section 51 of the ultrasonic tool 20, as depicted in FIG. 2. In implementations in which the transducers 45, 46 are mounted in the cylindrical wall 23, as depicted in FIG. 2, the ultrasonic tool 20 may not include the stabilizing fins 27.

Electronic circuits, microprocessors, memories, etc., operable to control and receive data from the transducers 45, 46, and perhaps to also process and store such data, may be mounted on a sleeve, an inner tube, and/or other section 21 secured around or within the collar of the ultrasonic tool 20. The section 21 and other components of the BHA 50 include a path 40 by which drilling mud may pass from the interior passage 8 of the drill string 6 to the bit 30.

The ultrasonic tool 20 is operable for measuring characteristics of the mud flowing upward to the surface via the annulus 10. For example, the mud may have entrained cuttings 19 resulting from the drilling process, and the ultrasonic tool 20 may be operable for detecting and/or measuring such cuttings 19.

FIG. 3-1 is a schematic view of an example implementation of the transducer mounting section 51 of the ultrasonic tool 20 shown in FIG. 2, and designated in FIG. 3-1 as transducer mounting section 100. FIG. 3-2 is a sectional view of the transducer mounting section 100 taken along a plane 101. The following description refers to FIGS. 3-1 and 3-2, collectively.

The transducer mounting section 100 may comprise four pulse-echo transducers 102-105 each oriented toward the wall of the wellbore at different respective azimuths 106-109 and axial locations 110-113. The plane 101 is through the axial location 110 and bisects the transducer 102 at azimuth 105. Thus, the transducers 102-105 may provide cutting measurements in azimuthally distributed positions on the wellbore surface. Although FIG. 3-1 depicts four transducers 102-105, other implementations within the scope of the present disclosure may include one, two, three, or more than four transducers.

The transducers 102-105 are each connected to data acquisition and storage electronics 114 (and/or other electronics in the BHA) in an electronics section 115 inside a collar 116 of the ultrasonic tool. An inner tube 117 (and/or portion of the collar 116) defines the internal mud passage 40.

Among other functions, the electronics 114 provide magnetic orientation at the time of ultrasonic measurements using a magnetometer 118. The transducer 102 shown in FIG. 3-2 is depicted as a simplified structure of a pulse-echo transducer that comprises a metal bulkhead feed through connector 119, a metal housing 120 in an outer recess 121 of the collar 116, a backing 122, a piezo-element 123, and a front-face protective window 124.

Figures 3, 4:
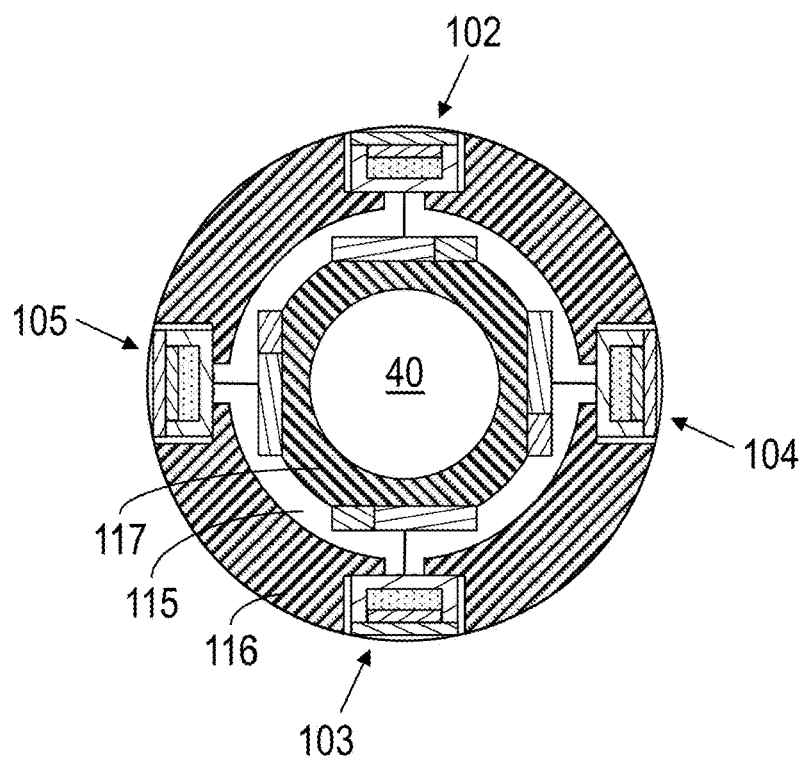
Figures 1, 4:
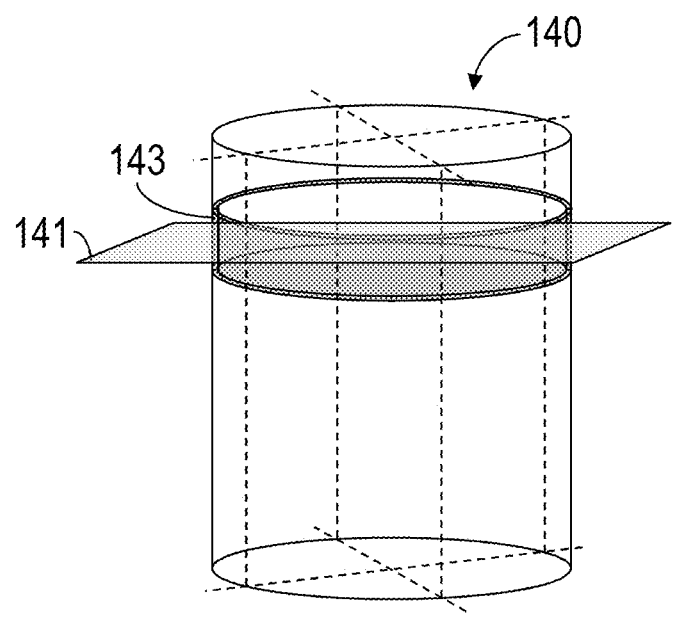
Figures 2, 4:
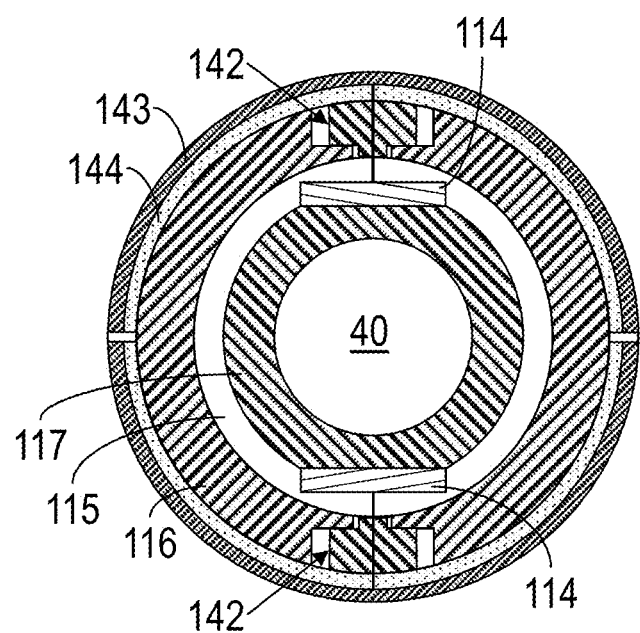

FIG. 3-3 is a schematic view of another example implementation of the transducer mounting section 100 shown in FIG. 3-1, and designated in FIG. 3-3 as transducer mounting section 130. FIG. 3-4 is a sectional view of the transducer mounting section 130 taken along a plane 131. The following description refers to FIGS. 3-3 and 3-4, collectively.

The transducer mounting section 130 is substantially similar to the transducer mounting section 100 shown in FIGS. 3-1 and 3-2, with the exception that the transducers 102-105 are each at the same axial location 110. Such in-plane mounting may be utilized for wellbore and cutting measurements simultaneously at the same depth of a well. However, other mounting methods in different combinations are also within the scope of the present disclosure, such as three in-plane transducers, a pair of in-plane transducers at each of two different axial positions, and/or other examples.

FIG. 4-1 is a schematic view of another example implementation of the transducer mounting section 130 shown in FIG. 3-3, and designated in FIG. 4-1 as transducer mounting section 140. FIG. 4-2 is a sectional view of the transducer mounting section 140 taken along a plane 141. The following description refers to FIGS. 4-1 and 4-2, collectively.

Instead of using four isolated pulse-echo transducers, the transducer mounting section 140 has two phased array transducer units 142 mounted on the ultrasonic tool at two azimuthal positions 180 degrees apart. The outer piezoelectric phased array 143 surrounds backing 144, and may include a protective film (not shown). The transducer mounting section 140 may be operable for full-azimuth scanning.

Figures 1, 5:
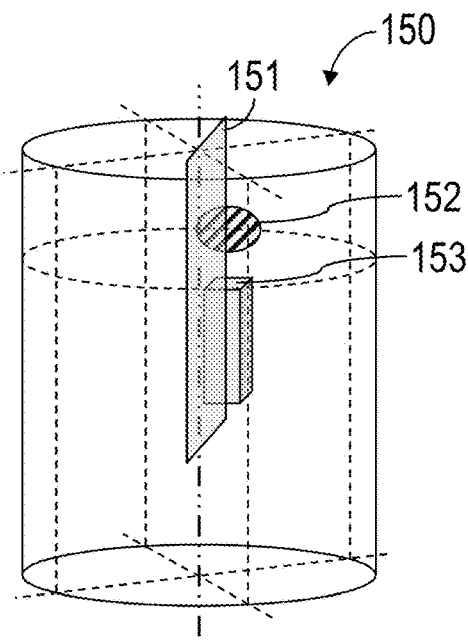
Figures 2, 5:
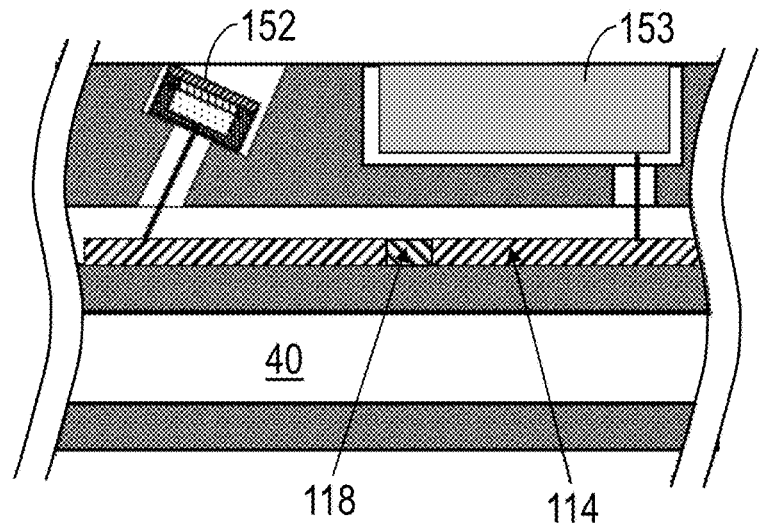

FIG. 5-1 is a schematic view of another example implementation of the transducer mounting section 51 shown in FIG. 2, and designated in FIG. 5-1 as transducer mounting section 150. FIG. 5-2 is a sectional view of the transducer mounting section 150 taken along a plane 151. The following description refers to FIGS. 5-1 and 5-2, collectively.

The transducer mounting section 150 includes a pitch-catch sensor comprising at least one transmitter unit 152 and at least one receiver unit 153. The transmitter unit 152 may be electrically driven utilizing the electronics 114 used for FIG. 3-2, so that after exciting an ultrasonic pulse (pitch), the transmitter unit 152 can provide a pulse-echo signal that may include a cutting echo. However, the receiver unit 153 may also (or instead) be operated in pulse-echo mode utilizing receiver electronics having a firing function.

Figure 6:
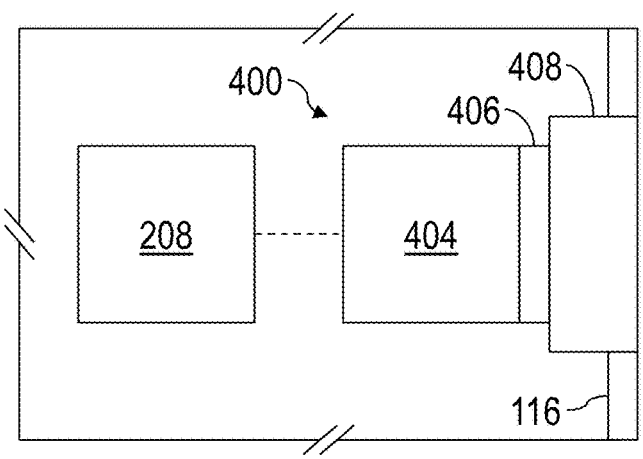
FIG. 6 is a schematic view of at least a portion of an example implementation of apparatus according to one or more aspects of the present disclosure.

FIG. 6 is a schematic view of a simplified pulse-echo configuration of an ultrasonic transducer 400 according to one or more aspects of the present disclosure. The ultrasonic transducer 400 may form at least a portion of an implementation of a transmitter and/or receiver described above, or an ultrasonic tool within the scope of the present disclosure may have one or more instances of the ultrasonic transducer 400 instead of (or in addition to) the transmitters and receivers described above.

The ultrasonic transducer 400 includes a backing 404, a ceramic element 406, and a delay line 408. The ultrasonic transducer 400 is operably connected with the electronics 114 described above and/or the surface equipment 7 shown in FIG. 1. The delay line 408 may be flush with the outer surface of the collar 116, as depicted in FIG. 6, or an acoustically transparent window (not shown) in the collar 116. The delay line 408 may be configured to control the delay time of the ultrasonic pulse transmitted or received by the ceramic element 406, to minimize ultrasonic pulse scattering, and/or to provide impedance matching between the transmitter and receiver, among other factors.

The piezoelectric element 406 may include one or more piezoelectric ceramics, such that an applied voltage pulse causes the piezoelectric element 406 to transmit a pressure wave (e.g., an ultrasonic wave). When a reflected pressure wave is intercepted by the piezoelectric element 406, the piezoelectric element 406 converts the intercepted pressure wave into an electric pulse, for example, voltage pulse.

The ultrasonic transducer 400 can operate in a pulse-echo or transceiver mode, where the ultrasonic transducer 400 both emits an ultrasonic pulse and receives the reflected ultrasonic pulse. For example, referring also to FIG. 1, the emitted ultrasonic pulse can travel through mud in the wellbore 9 and reflect off of the subterranean formation 32 and/or cuttings 19 in the mud before returning back to the ultrasonic transducer 400. The reflected signals can be captured as a measured electrical voltage. The ultrasonic transducer 400 may also measure the firing noise of the emitted ultrasonic pulse.

Ultrasonic methods, such as for imaging or non-destructive evaluation (NDE), can be utilized to characterize a given surface or other acoustic reflector via analysis of backscattered echoes. Such acquisitions may be achieved via pulse-echo operations, in which the same ultrasonic transducer that is excited is also used to capture the reflected echo. Each of the transmitters, receivers, and transducers described above, among others also within the scope of the present disclosure, may be operated in such pulse-echo mode. Alternatively, the transducer 400 can be the transmitter unit of a pitch-catch sensor being operated in pulse-echo mode.

Figure 7:
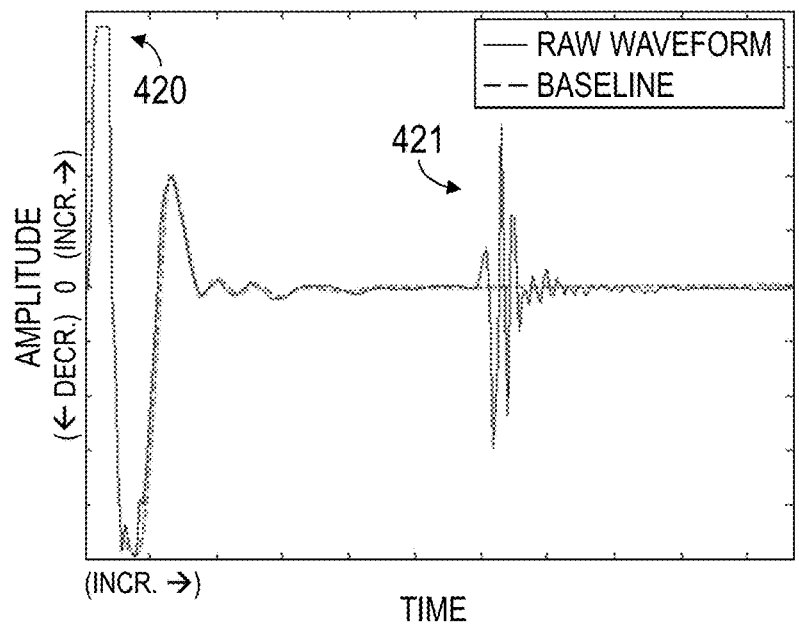
FIG. 7 is a graph depicting an example pulse-echo signal.
Figure 8:
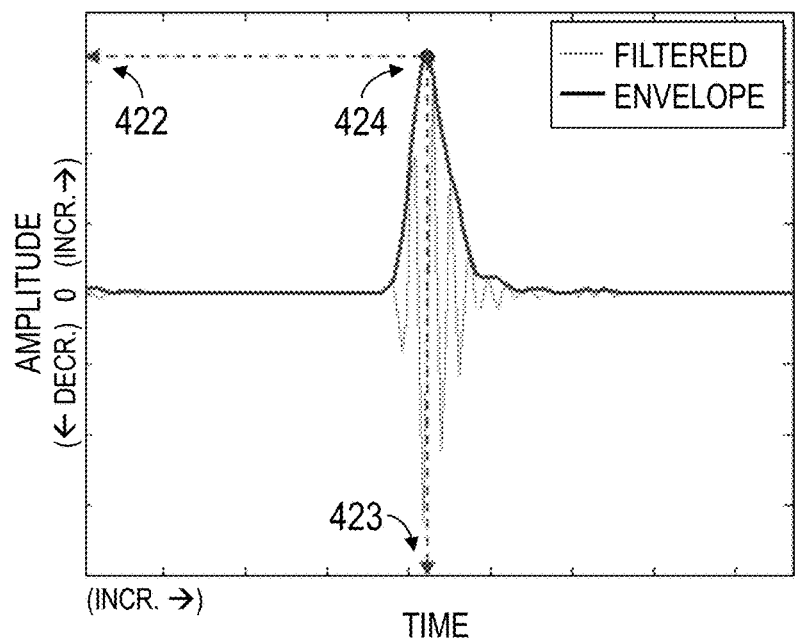
FIG. 8 is a graph depicting an example pulse-echo signal and its envelope, from which echo attributes can be extracted.

FIG. 7 is a graph depicting an example pulse-echo waveform, including the firing or excitation response (pulse) 420 and its reflection as a singular echo 421. FIG. 8 is a graph depicting how, after the waveform has been acquired and pre-processed (e.g., via filtering), the waveform pulse 420 can be characterized to reveal the distance, acoustic impedance, and/or other information about the reflector 421 via the amplitude 422 and the travel time 423 of the peak 424.

Figure 9:
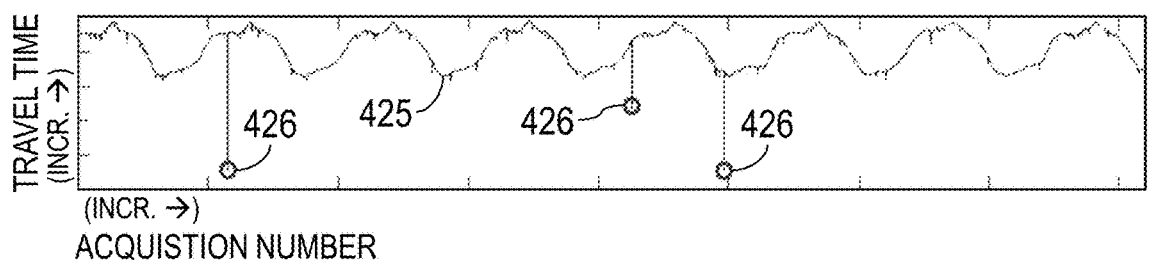
FIG. 9 is a graph depicting time-series of travel time that was acquired as one of the attributes of pulse-echo signals.

The examples depicted in FIGS. 7 and 8 are from a laboratory environment. In contrast, pulse-echo acquisitions acquired in an actual LWD environment, such as the wellbore 9 depicted in FIG. 1, are subject to cuttings 19 being generated during the drilling process and actively passing in front of the transducer(s). As an example, FIG. 9 is an example travel time profile of 4,000 sequential acquisitions. The travel time of the tool, rotating at an eccentered position in borehole, appears as a cyclical sinusoid 425, embedded in which are three sporadic and instantaneous drop-offs 426 each associated with cuttings.

Figure 10:
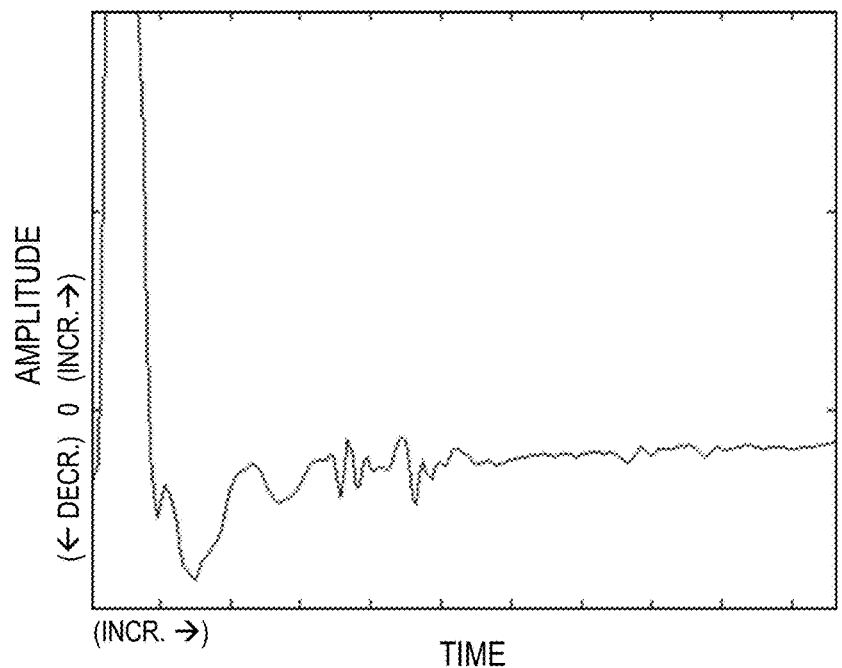
FIG. 10 is a graph depicting a pulse-echo signal of borehole echo under the presence of a cutting.
Figure 11:
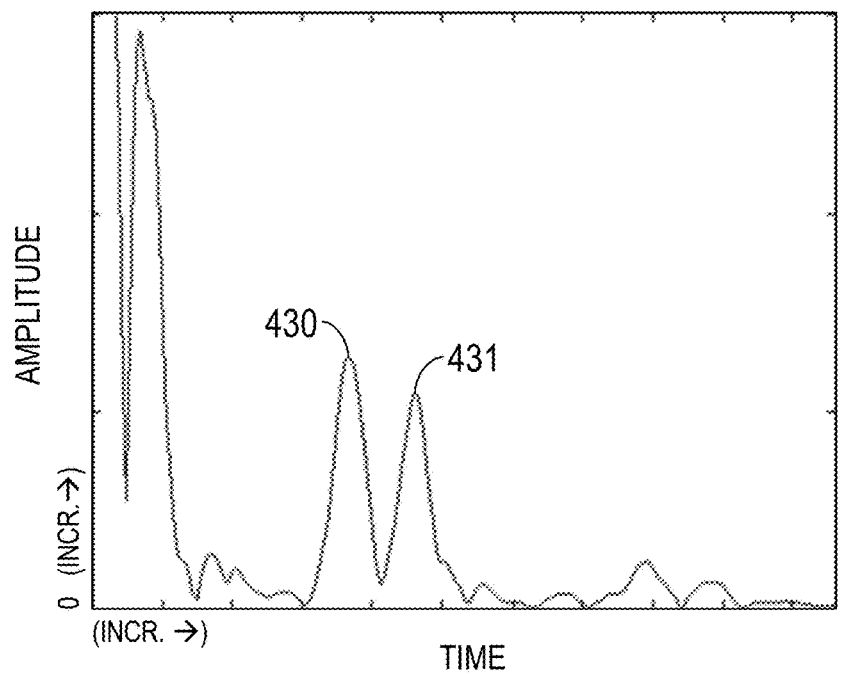
FIG. 11 is a graph depicting an envelope of the pulse-echo signal presented in FIG. 10.

Such acquisitions contaminated by cuttings at the waveform level give additional insight into what is happening downhole. For example, FIGS. 10 and 11 are raw and filtered versions of a waveform for when a cutting is involved. On the filtered waveform in FIG. 11, a two-echo signature can be seen, including a cutting echo 430 and a formation echo 431. The cutting echo 430 is strong enough that it actually supersedes the formation echo 431. This results in the cutting echo 430 being erroneously selected in the formation echo acquisition process where criteria are based (perhaps solely) on maximum amplitude.

Figure 12:
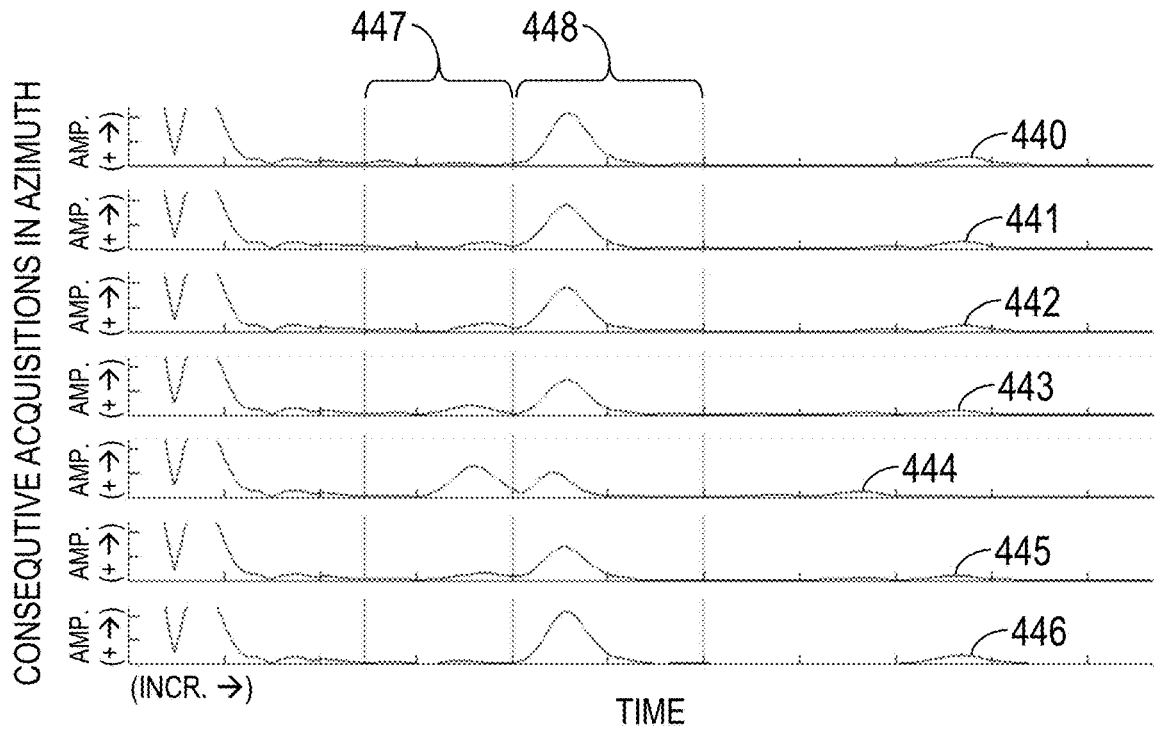
FIG. 12 includes seven graphs collectively depicting pulse-echo signal envelope waveforms from consecutive signal acquisitions in time.

However, few cuttings will appear in the travel time profile unless they are exceptionally large. In most cases, the cutting echo will be small enough to not supersede that of the formation echo. In these instances, the formation echo is still the primary echo in the signal, relative to the cutting echo, so the travel time profile will not be affected. The amplitude profile, however, will be somewhat degraded, as is shown in the visualization of a passing cutting in FIG. 12, depicting filtered waveforms vs. time over seven sequential acquisitions, e.g., at a first azimuthal position 440, a subsequent azimuthal position 441, and the next five azimuthal positions 442-446. In a "cutting region" 447, the onset of a passing cutting can be observed. It becomes most apparent in the waveform for the acquisition at the fifth azimuthal position 444, which is where it is most obscuring the transducer. As the cutting traverses the field of the transducer, the amplitude of the formation echo (in a "formation region" 448) progressively begins to drop, as depicted by the progressive decrease from the azimuthal position 440 through the azimuthal position 444, and then recovers as the cutting passes, as depicted by the progressive increase from the azimuthal position 444 through the azimuthal position 446. Thus, FIGS. 10-12 demonstrate that the travel time is far less sensitive to cuttings than the amplitude.

Accordingly, it can be clear from the waveform level when a cutting is present. In practice, however, just the amplitude of the formation echo may be recorded, and not the waveform. The amplitude of the formation echo is affected by the characteristics of the formation and the cutting that is obscuring the formation at a given point in time. Consequently, the contributions of each cannot be decorrelated. In terms of measurement, it is difficult to discern whether a single measurement is either from a cutting or actual rugosity of the formation that causes the corresponding amplitude drop, except the significant cases 426 depicted in FIG. 10. Instantaneous travel time reduction 426, which indicates a singularity protrusion on a wellbore surface, may be less likely to be present in the actual drilling environment.

Figure 13:
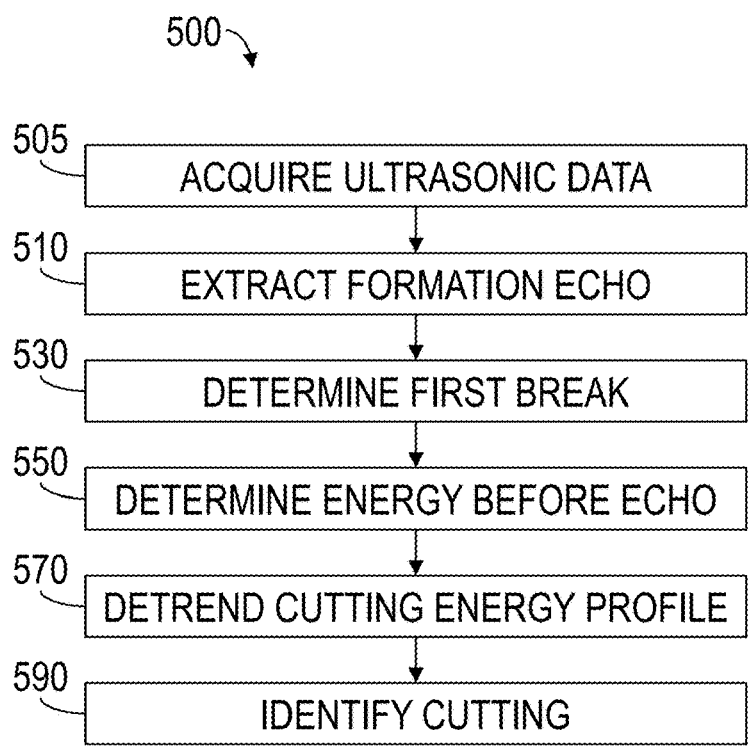
FIG. 13 is a flow-chart diagram of at least a portion of an example implementation of a method according to one or more aspects of the present disclosure.

Thus, the present disclosure introduces one or more aspects related to observing the energy before the formation echo to distinguish between cuttings and actual rugosity of the formation. FIG. 13 is a flow-chart diagram of at least a portion of an example implementation of a method (500) of detecting cuttings according to one or more aspects of the present disclosure. The method (500) may include acquiring (505) ultrasonic data utilizing (or otherwise in conjunction with) an implementation similar to the wellsite system shown in FIG. 1 and/or other wellsite systems, a downhole tool similar to an implementation of the ultrasonic tool 20 described above and/or other downhole tools, an implementation of a transducer similar to one or more of the transducers described above, and/or an implementation of the processing system 900 shown in FIG. 26 (described below). Utilizing the acquired (505) data, the method (500) may include one or more of extracting (510) the formation echo, determining (530) the first break associated with the extracted (510) echo (the first break being a characteristic of the signal described below), determining (550) the energy before the extracted (510) echo, detrending (570) the energy before echo profile, and identifying (590) the cutting.

Extracting (510) the formation echo (generally the one with the highest amplitude, hereafter referred to as AMP) may include finding the largest peak in the acquired waveform. The waveform may be the acquired (505) raw data or the result of filtering and/or other pre-processing. The amplitude of the largest peak localizes the formation echo in time, hereafter referred to as travel time or TT. This extraction (510) readies the waveform and sets the reference point for the determination (530) of the first break.

The cutting indicator is reliant on the energy before the echo. Thus, the point just before the arrival of the echo, commonly referred to as the first break, is determined (530). The first break may be determined (530) using the TT of the extracted (510) formation echo. For example, determining (530) the first break may include estimating the first break by applying a constant offset ($\Delta t$) based on empirical evidence. An example is depicted in the graph shown in FIG. 14, in which the acquired (505) data (raw or pre-processed) 600 is superimposed with the echo envelope 601. The extracted (510) echo is determined via the peak 602 having the largest amplitude 603, thus providing the TT 604. The empirically-based offset 605 from the TT 604 determines (530) the first break 606.

However, in some implementations, the empirically-based, constant offset 605 may not encompass slight first break variances, due to sensitivity to numerous parameters, such as stand-off, drilling mud properties, pressure, temperature, aspects of the transducer assembly, and others, when a singular constant value is used. Thus, the first break may instead (or also) be determined (530) via estimating from a linear extrapolation.

Figure 14:
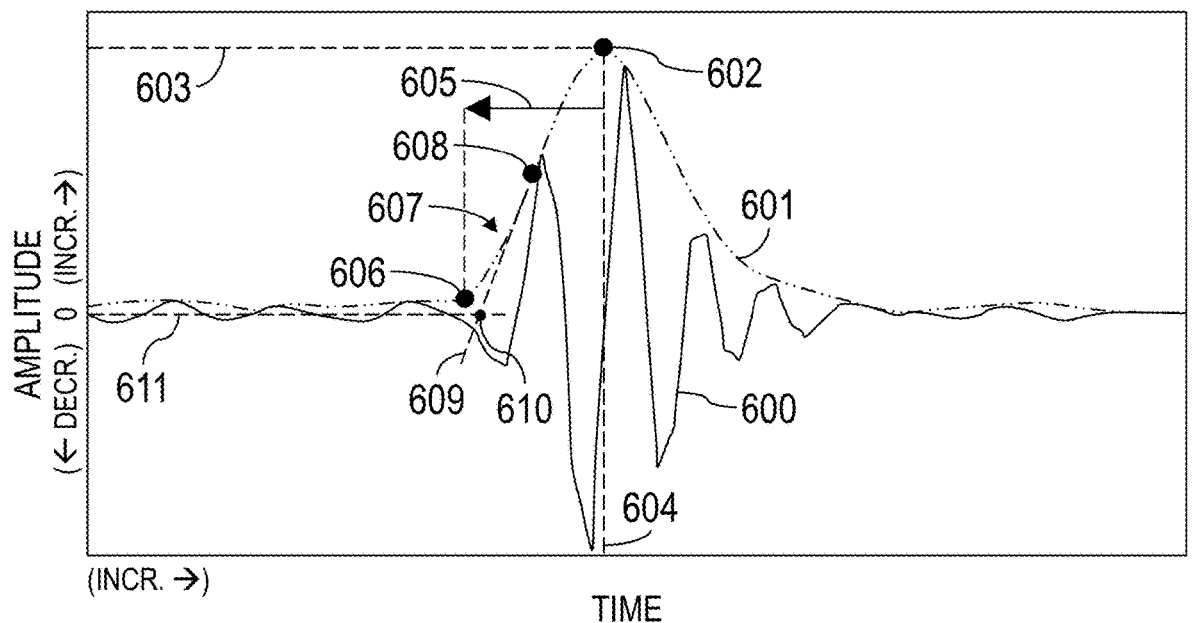
FIG. 14 is a graph depicting an echo signal wave packet and its envelope for echo break time detection.

For example, taking the peak amplitude 603 and the corresponding TT 604, linear fitting 609 may be used to generalize the slope of the rising edge 607 of the formation echo envelope 601. The shape of the rising edge 607 is somewhat sigmoidal, so the fitting may also use an intermediate point 608 that precedes the peak TT 604. For example, the closest point on the rising edge of the envelope based on a user-given proportion to the peak amplitude may be used. The closer to the zero-crossing 610 that this intermediate point is selected, the better the linear fitting becomes, but the value can vary. For example, a point that corresponds to 50% of the maximum amplitude may be used, as depicted in FIG. 14. The two points that directly neighbor the intermediate point 608 are then selected as values from which to determine the linear fit 609. The linear fit 609 is then projected to cross the zero-amplitude line 611, and the crossing 610 is utilized as an estimate of the first break. However, the aforementioned is just one way to select the points for the linear fitting 609. In practice, there are many other approaches that can be used, such as using each of the points that are spanned by the first sign-change of the envelope 601 to the midpoint or other intermediate point 608. Additionally, while the above example utilizes linear extrapolation to estimate the zero-crossing 610, a higher order model fitting may also be used, such as a polynomial, exponential, and/or others.

Figure 15:
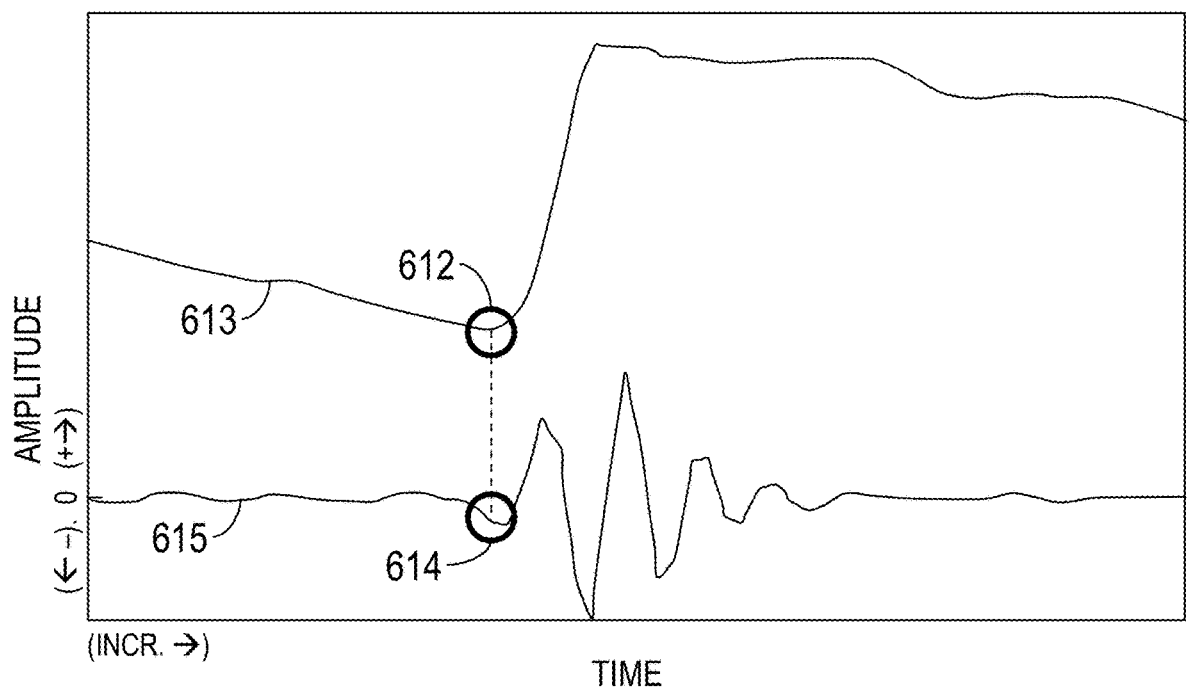
FIG. 15 is a graph depicting a curve of entropy function on top of echo signal from which the curve was derived.

The first break may also be determined (530) using entropy-based approaches, such as the Akaike-Information Criterion (AIC) or the Bayesian Information Criterion (BIC). For example, as depicted in FIG. 15, the echo-proximate minimum or "knee" 612 of the entropy function over time 613 temporally corresponds to the first-break 614 in the waveform 615.

Having determined (530) the first break, the energy before the echo can be determined (550). For example, the square amplitude values of the waveform that precede the location of the first break may be summated. Such approach is simple in implementation, and may contain transducer ring down noise. However, the ring-down energy summated will be a well-specified, transducer-specific profile as a function of TT, and cutting-borne energy can be identified as deviation from the transducer-specific energy profile.

Instead of the summing, the energy before the echo may be determined (550) by detecting the largest peak before the first break. If the transducer ring-down noise is first removed or minimized to the amplitude smaller than the peak corresponding to the cuttings, such as by the pre-processing and/or design of transducers and/or electronics, multiple peaks before the echo can be detected as cutting-borne echo. Of the peaks that are found, the peak that lies before the first break and possesses the largest amplitude may be selected as relating to the potential cutting. In comparison to the summing approach described above, determining the largest peak before the echo permits localization of the cutting in terms of time.

Figure 16:
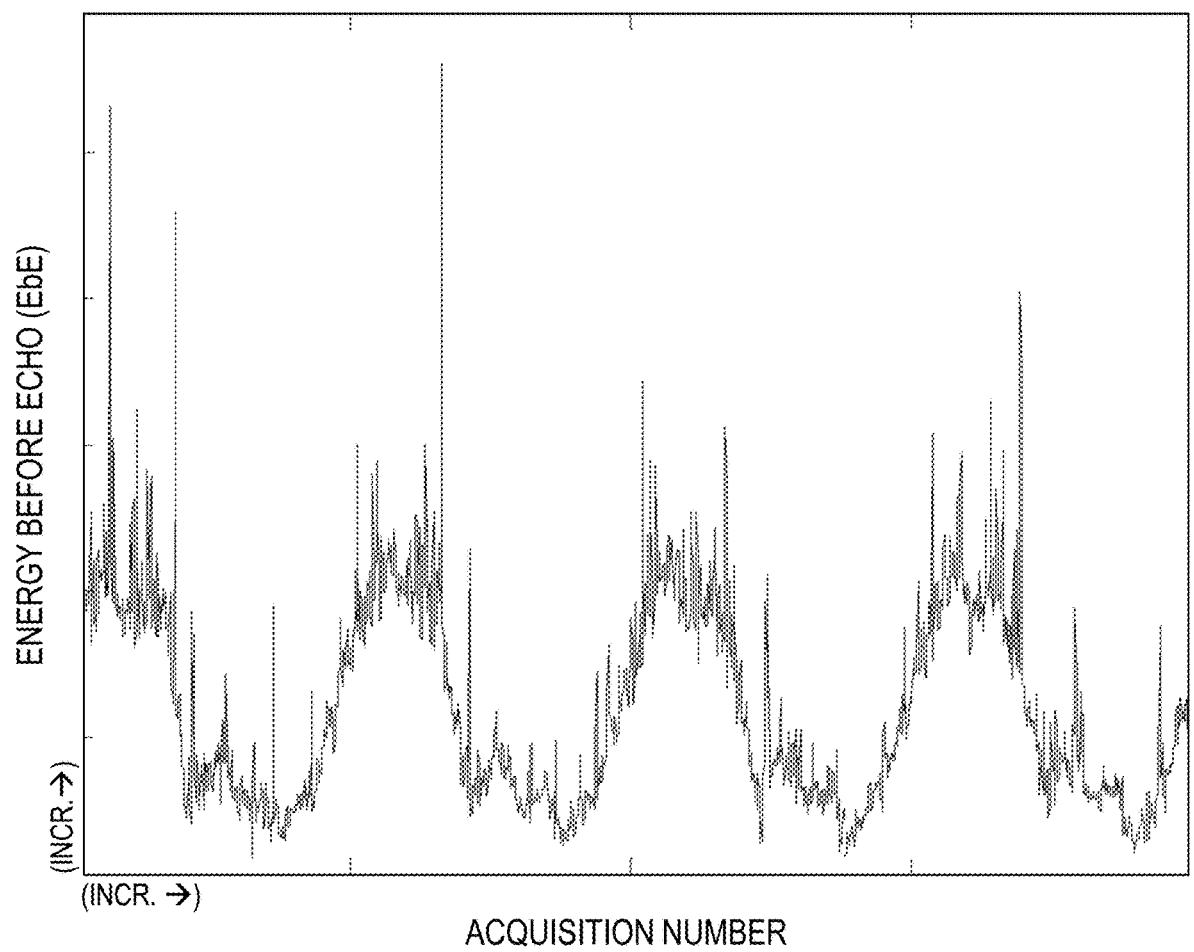
FIG. 16 is a graph depicting a curve showing energy before echo (EbE) as a function of echo signal acquisition number.

Whether the summing or peak approach is utilized to determine (550) the energy before the echo, an apparent trend correlating to the transducer stand-off may exist in the energy profile, as depicted in FIG. 16, plotting energy summation for each acquisition. This trend may or may not be apparent depending on the transducer ring-down magnitude relative to cutting echo energy, and may be stronger if the transducer ring-down is not minimized. In either case, to reliably facilitate the subsequent cutting identification (590), the determined (550) energy-before-echo (EbE) profile may be detrended (570) and/or otherwise processed to remove the underlying stand-off dependent trend and, thus, improve the contrast and observability of the cuttings.

Figure 17:
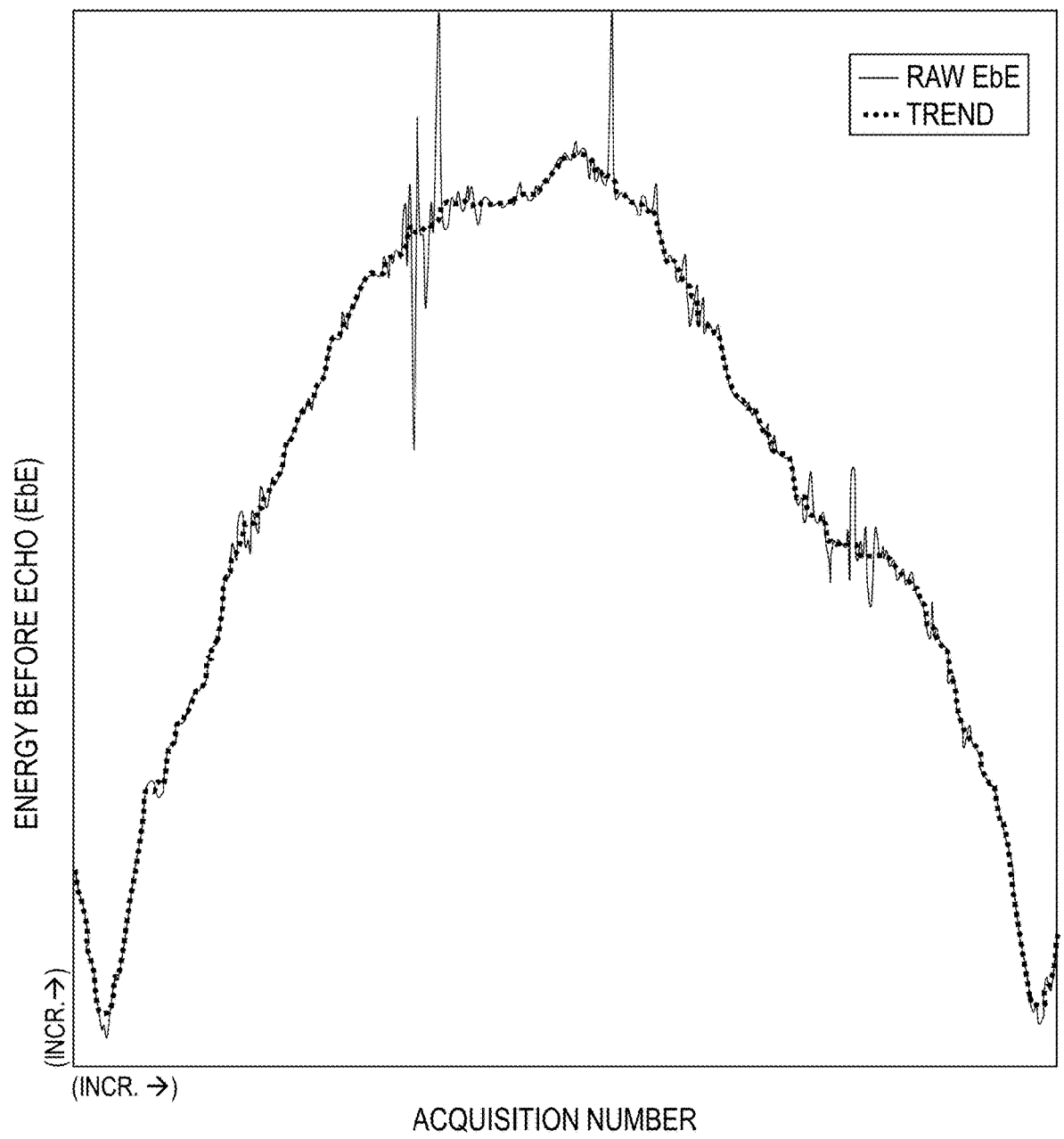
FIG. 17 is a graph depicting an example of a raw EbE and its trend.
Figure 18:
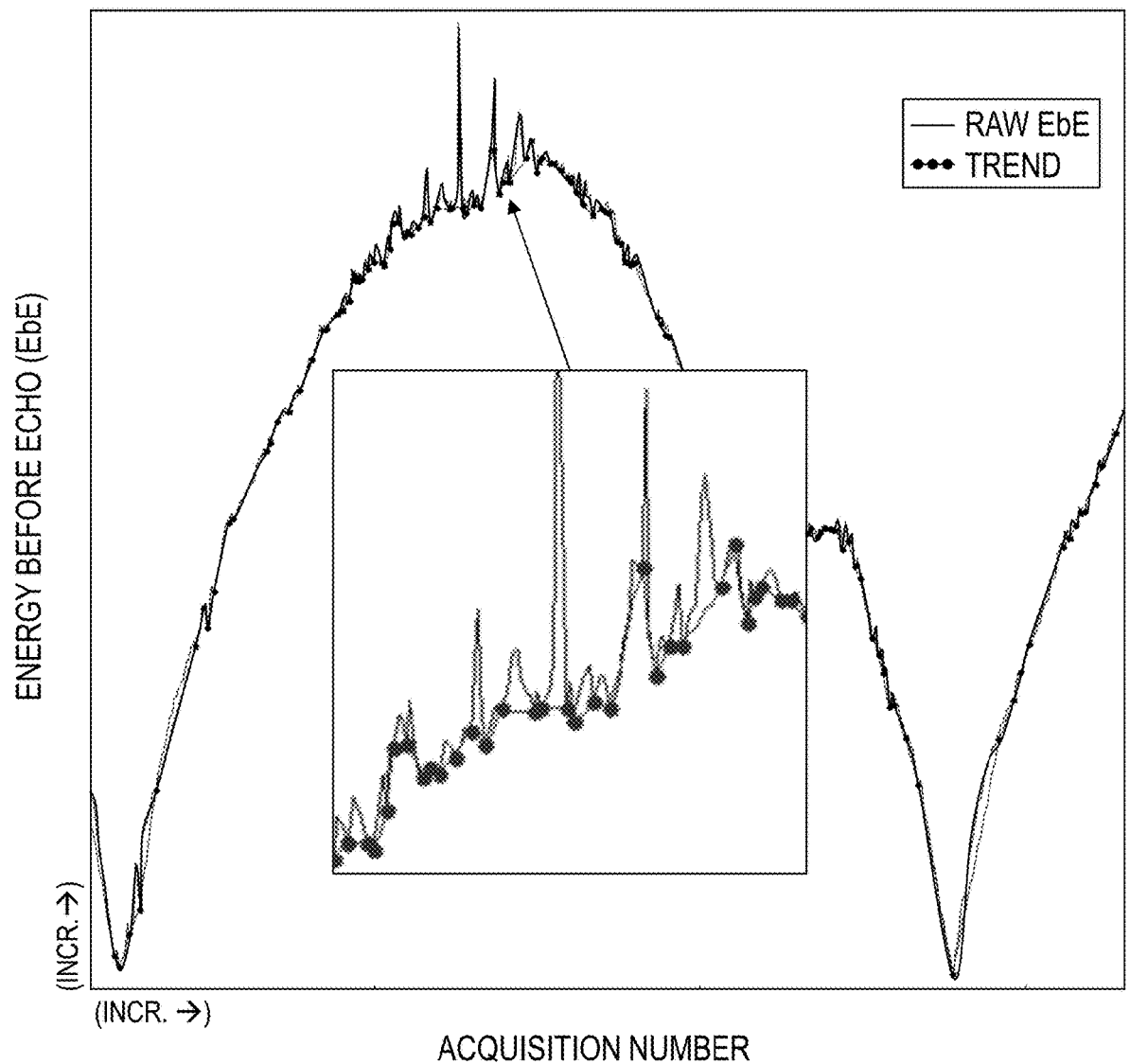
FIG. 18 is a graph depicting another example of a raw EbE and its trend.
Figure 19:
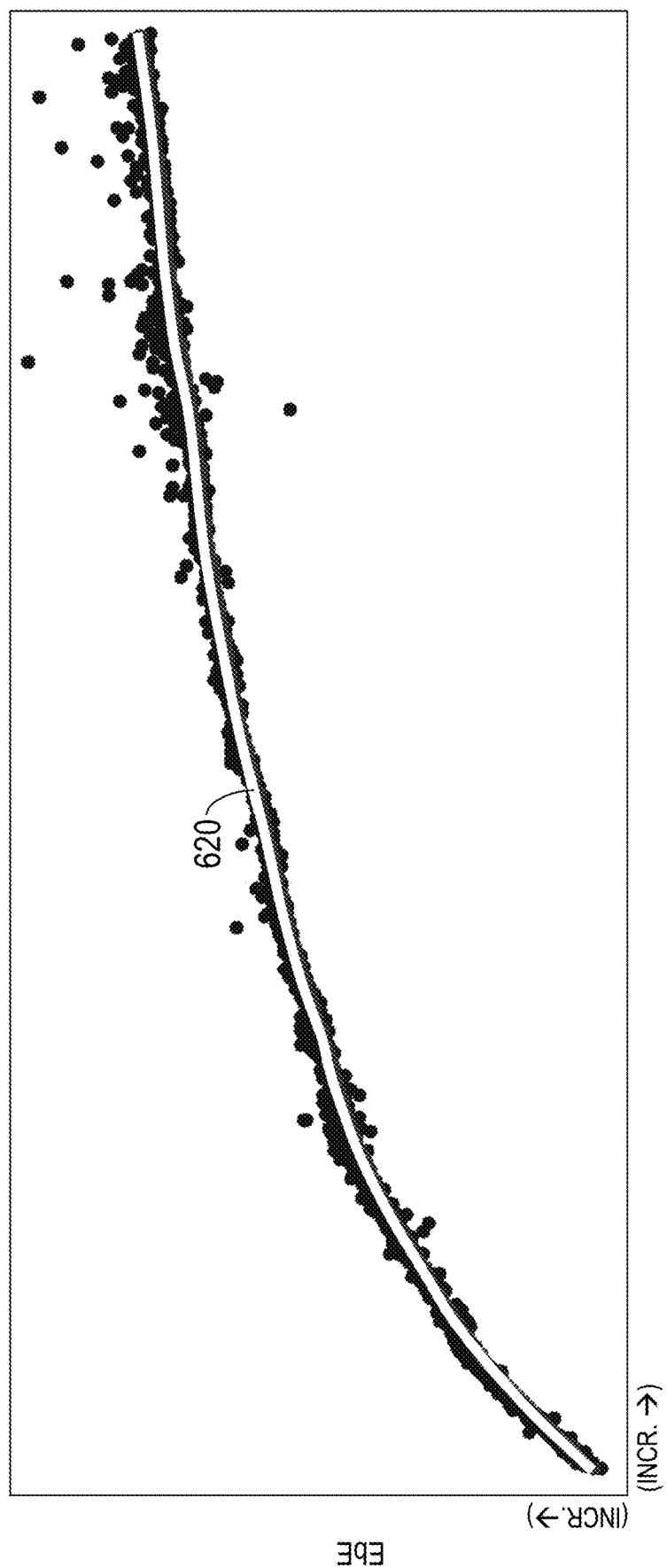
FIG. 19 is a graph depicting a raw EbE data and its trend line as a function of travel time.

Various methods may be utilized for such detrending (570). Examples include short-window smoothing (such as with a moving mean or median) as depicted in FIG. 17, and trend estimation using minima-detection in finite acquisition window as depicted in FIG. 18. After the trend has been determined, it can be subtracted from the profile to flatten the signal, making the spikes pertaining to the cuttings more observable. Another possible method for detrending (570) the data is via a TT vs. EbE cross-plot that reveals the effect that the transducer stand-off has on the summated energy, as depicted in FIG. 19. A representative curve 620 (depicted in FIG. 19 as a white line) can then be fit over the profile of the cross-plot. The curve 620 can then be used to equalize each of the points that pertain to a given TT, resulting in a detrended profile (570). Standoff-dependent energy offset of EbE can be uniquely determined from the profile 620 at given TT.

Having removed the stand-off trend from the energy profile, identification (590) can be made on whether the acquisition is indeed contaminated by a cutting. That is, the signal has been essentially flattened via the detrending (570), so that a threshold can be determined using, for example, a median to approximate the "noise floor." The noise floor is assumed to be relatively constant, so the median can be determined for the entire dataset, or a portion thereof, over a long window.

The median provides an estimate of the noise floor, but may also be further adjusted. For example, such adjustment may be via simple scaling using a multiplier $\sigma$, which effectively adjusts the relative level of the threshold relative to the noise floor (the median estimate). Higher values for a permit greater discerning of the identification (590) of cuttings, such that just the larger cuttings will be identified. For the sake of example, "larger" cuttings may be those that are not encompassed by a cutting area projected on transducer surface on the order of a quarter wavelength in drilling mud, although other example sizes are also within the scope of the present disclosure. For example, in a water at ambient conditions, wave propagation speed will be about 1500 meters/second (m/s), and quarter wavelength at operating frequency of 250 kHz will be about 1.5 millimeters. Although it will be dependent on mud properties, particularly attenuation, the frequency of interest may range between 50 kHz and 500 kHz, and drilling mud acoustic wave propagation speed may range between about 1000 m/s and about 1700 m/s, although aspects of the present disclosure are also applicable or readily adaptable to other frequencies and propagation speeds.

The threshold may be discerning enough such that falsely identified cuttings are minimized. For example, the value of the threshold may be set to be above the level of the noise floor. In practice, the noise floor can be estimated using a median value of a short window (e.g., one rotation) or, if the noise floor is not expected to change significantly after detrending, a constant value based on the median may be representative of the entire imaging operation. In an example implementation, the value of the threshold adjustment multiplier $\sigma$ may range between about 3 to 5 higher than the median value. However, other values for $\sigma$ are also within the scope of the present disclosure.

Figure 20:
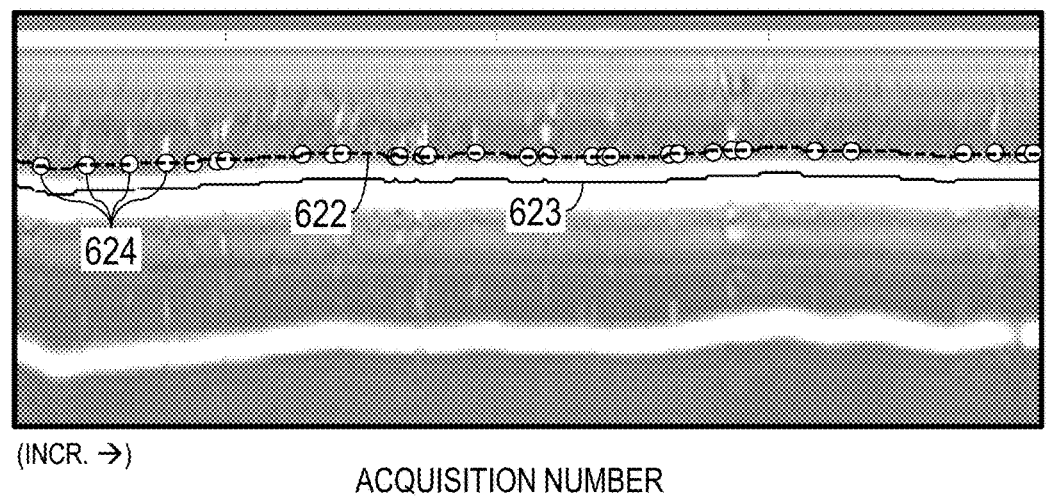
FIG. 20 presents echo signal waveforms that are presented in a two-dimensional image in the vertical and horizontal axes of waveform samples and acquisition number, where amplitude value at one waveform sample and acquisition number is mapped into one pixel, varying its color from black to white.
Figure 21:
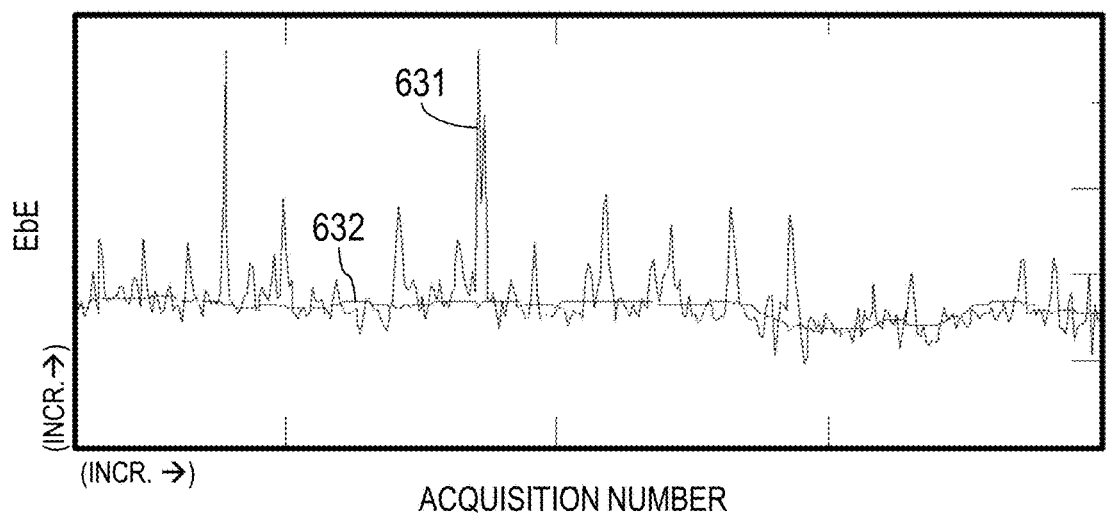
FIG. 21 is a graph depicting EbE that was determined using the data in FIG. 20.
Figure 22:
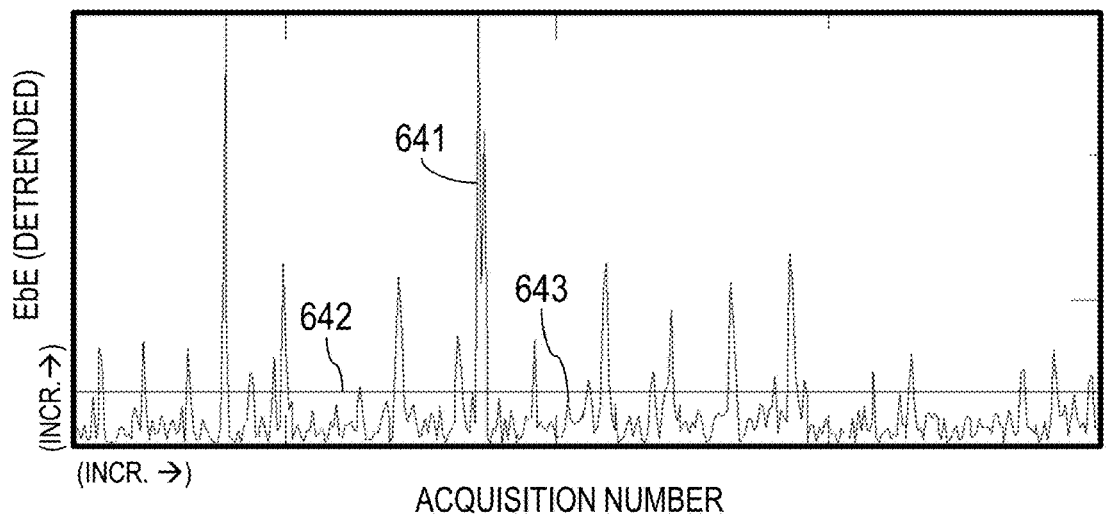
FIG. 22 is a graph depicting the data in FIG. 21 after being detrended.

An example result of the cutting identification (590) is depicted in FIGS. 20-22. In FIG. 20, sequential waveforms are depicted in the manner of a variable density log, with the addition of the peak TT 623, the first break 622, and several cutting indications 624. FIG. 21 depicts EbE 631 and the EbE trend 632, and FIG. 22 depicts the resulting detrended energy profile (EbE) 641 and threshold 642. For the threshold 642, the multiplier $\sigma$ is set to 5, so that detrended EbE values exceeding 5 times the median indicates that the acquisition is considered contaminated by a cutting.

In FIG. 20, the total energy from the first break 623 to the beginning of the acquisition time (the first sample) are cumulated. They are then detrended to remove the effect of eccentricity, yielding the EbE profile 641 shown in FIG. 22. Threshold 642 may be empirically adjusted at different values depending on purposes and comparing numbers of spikes that are below 623 and protrude 624 from the threshold 642, but all above the seemingly low noise floor. For example, to selectively detect just large cuttings, the multiplier $\sigma$ may be set at a relatively large value, and to detect all possible cuttings without missing any, the multiplier a can be adjusted to even lower than 3, for example, 1.5, and integrate them over a certain period of acquisition duration. When the detrended EbE 641 exceeds the threshold 642, then those samples 624 of that acquisition are identified (590) as being affected by the presence of a cutting. As depicted in FIG. 20, the example contaminated acquisitions 624 substantially coincide with the spikes visible in the energy profile 641 of FIG. 22.

The resulting metric of the cutting indicator may be utilized in real-time, and also for post-job quality assurance and ultrasonic measurements improvement (including imaging). For example, the cutting indicator can be utilized to indicate the volume (cutting count) and the relative size (indicated by the distribution) of the downhole cuttings. This information may be utilized, perhaps with additional information, to determine and/or estimate the subterranean formation type, drilling efficiency, bit condition, tool dynamics, and/or other answer products, such as by comparing the cutting volume and the rate-of-penetration (ROP) of the drill bit into the subterranean formation. Unfavorable precursors may also be determined and/or estimated based at least on the cutting volume and/or relative size, and perhaps other information. For example, at relatively high ROP (e.g., above about 30 meters/hour, among other examples), cuttings that are substantially not observable may indicate potential problems in cleaning and transporting cuttings, which could result in drill string sticking and even lost-in-hole events.

During drilling, waveforms may be acquired, and may be processed to extract echo attributes, in real-time. Such waveforms and attributes may be oversampled (perhaps several fold). To save storage memory, the data can be decimated downhole to meet predetermined criteria, such as 360, 180, 90, or 16 bins, among other examples. Because of oversampling, there may be several potential acquisitions that can be binned. One example scheme may be to select the acquisition that lies closest to the center of the bin, such as may be dubbed "uniform" decimation. However, the binning may also (or instead) be done using the energy before echo. For example, considering each of the possible candidate acquisitions that can fit into a bin, the acquisition having the lowest EbE may be selected as the representative for that bin.

Figure 23:
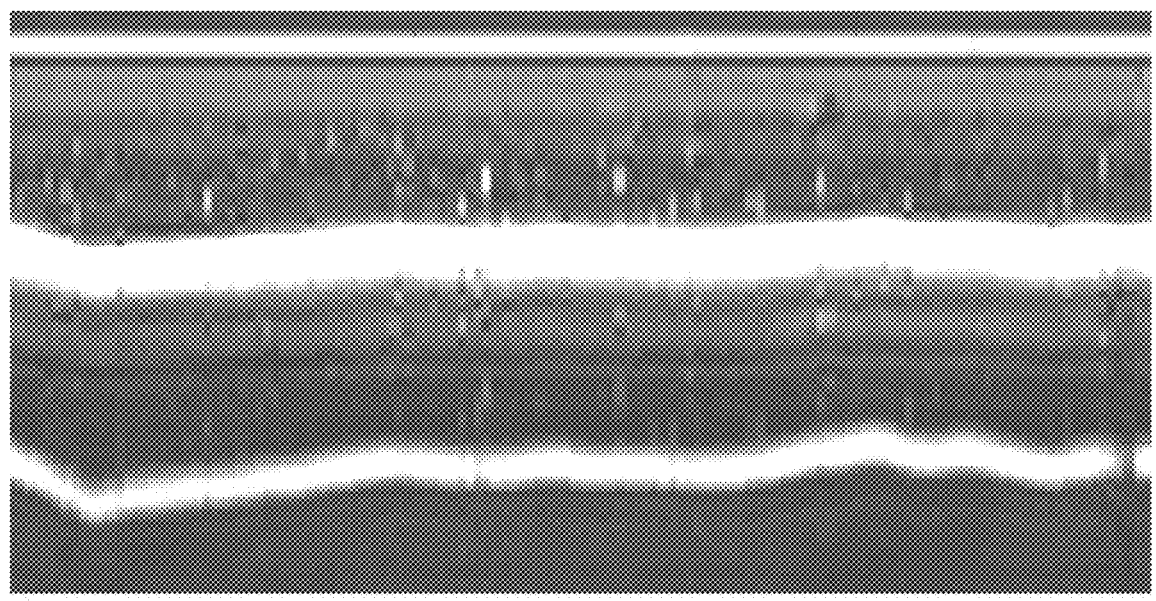
FIG. 23 is an image presenting echo signal waveforms that were azimuthally binned from a dataset acquired while the downhole tool made one turn, without applying selection rules based on EbE values.
Figure 24:
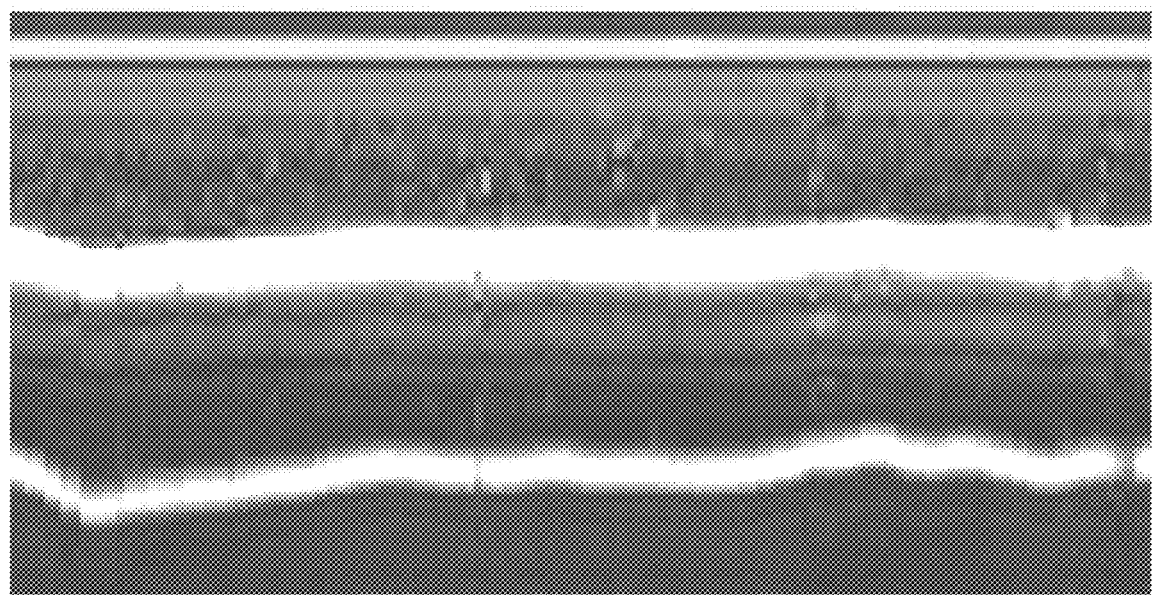
FIG. 24 image presents echo signal waveforms, that were azimuthally binned from the same dataset as FIG. 23, but applying selection rules based on EbE values.

This concept may be illustrated using waveforms acquired over the course of one rotation, such as shown in VDL-like fashion in FIGS. 23 and 24. FIG. 23 depicts example uniformly decimated waveforms at the closest angular positions at their center of each bin, from a dataset that was oversampled by a factor of 3 relative to a target number of bins of 180. FIG. 24 shows the example decimation waveforms with a selection based on the waveforms having the lower EbE. The EbE-decimated waveforms of FIG. 24 generally have the same overall shape as the uniformly decimated waveforms of FIG. 23, but with reduced cutting noise. This may improve borehole echo measurements quality downhole, such as real-time borehole imaging, by minimizing cutting effects.

A binned waveform and their attributes may still be contaminated by cuttings, so further improvement can be taken in the recorded-mode processing, e.g., post-job processing using a computer and memory data retrieved from downhole memory. For example, the cutting indicator can be used post-job (on recorded mode data) to further enhance the quality of borehole echo measurements, for example, post-processing or recorded-mode image. That is, the pixels of an ultrasonic image correspond to travel time and amplitude measurements for caliper or imaging purposes, respectively, and the cutting indicator can be recorded alongside these measurements according to one or more aspects of the present disclosure. Thus, the cutting indicator can be used for identifying the corrupted or significantly contaminated pixels, such as those that could not be avoided during the binning process due to the size or duration of the cutting. After the significantly contaminated pixels are identified, they can be eliminated via interpolation, such as is commonly done with missing data in borehole logs. Instead of (or in addition to) interpolation, if there are multiple transducers in the tool, it is also possible to select one pixel data from multiple transducers. For example, if four transducers acquire data of 180 azimuth bins at one depth, there are four data at one azimuth bin from four transducers. If the first transducer pixel is significantly contaminated, data from other transducers can be used as replacement to the first transducer's significantly contaminated pixel. The multiple transducers may be calibrated to have nearly identical sensitivities. To identify significantly contaminated pixels, the same data selection method as the downhole binning process as presented in FIG. 22 can be used for the binned dataset.

Figure 25:
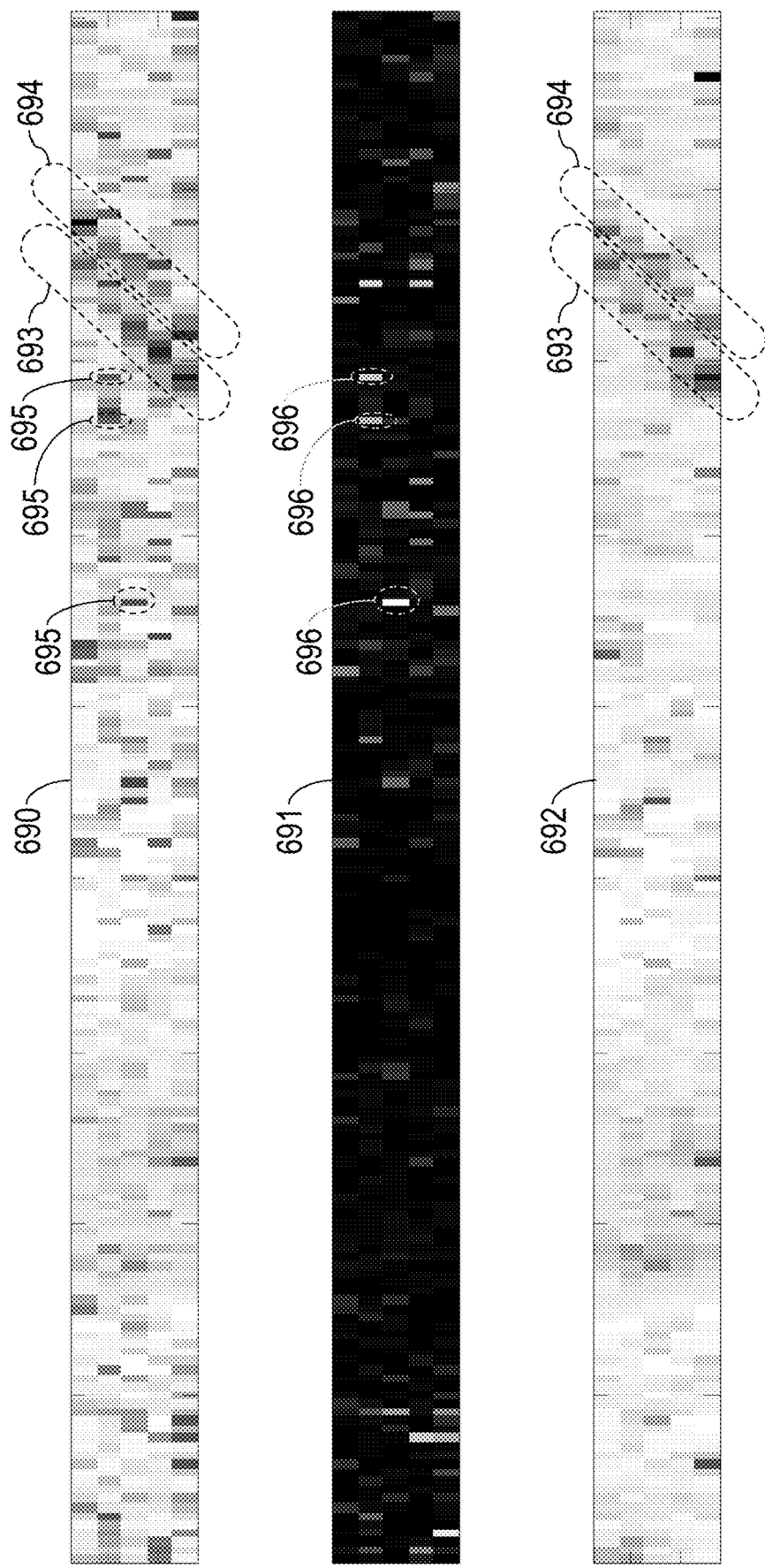
FIG. 25 includes three images showing echo amplitude data that was azimuthally binned without using EbE (top), corresponding EbE energy (center), and echo amplitude after being selectively binned using EbE (bottom).

FIG. 25 provides an example illustrating the correspondence of the cutting indicator generated simultaneously with an amplitude image 690. That is, for the example detrended energy before echo image 691, there may be a direct one-to-one pixel correspondence with the amplitude image 690. Because the data is processing in recorded-mode, the threshold for determining the significance of a cutting can be dynamically adjusted. In turn, this selectivity affects the intensity of the cutting denoising operation. The higher the threshold, the more selective the cutting identification will become, meaning that the pixels that are affected by just the larger cuttings will be flagged.

Referring still to FIG. 25, the presence of cuttings is denoted by the energy before echo image 691. From this image 691, a threshold can be adjusted and applied to determine which pixels have been contaminated by a cutting significantly enough to be removed. The removed pixels are regenerated by selectively smoothing via known uncontaminated neighbors. The selectively smoothed image 692 is much less grainy than the non-smoothed image 690 after excluding sporadic dark pixels 695 corresponding to bright or high EbE pixels 696, while still preserving two dark diagonal features 693, 694 in the borehole surface.

Figure 26:
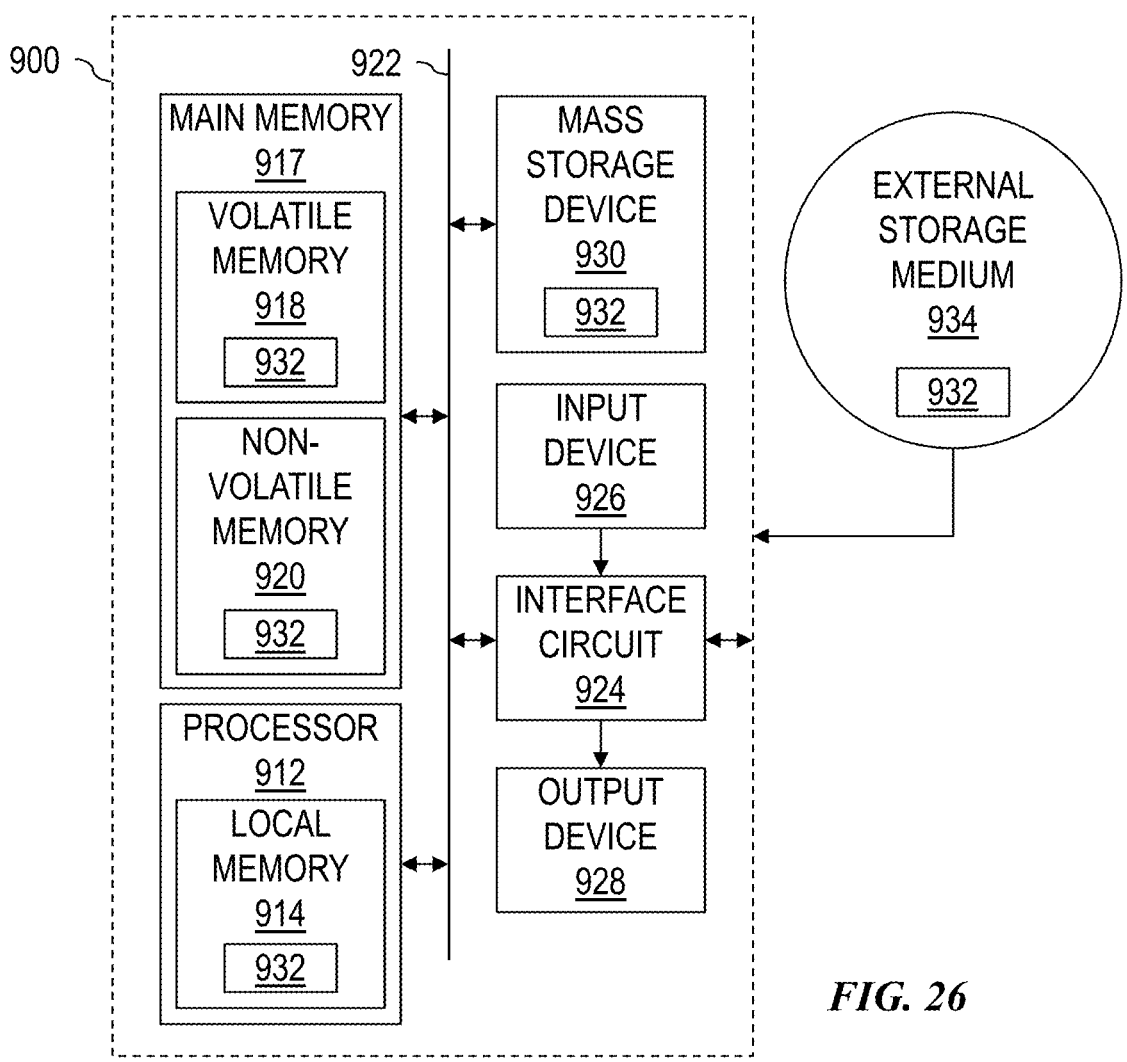
FIG. 26 is a schematic view of at least a portion of an example implementation of apparatus according to one or more aspects of the present disclosure.

FIG. 26 is a schematic view of at least a portion of an example implementation of a processing system 900 according to one or more aspects of the present disclosure. The processing system 900 may execute example machine-readable instructions to implement at least a portion of one or more of the methods and/or processes described herein, and/or to implement a portion of one or more of the example downhole tools described herein. The processing system 900 may be or comprise, for example, one or more processors, controllers, special-purpose computing devices, servers, personal computers, personal digital assistant (PDA) devices, smartphones, internet appliances, and/or other types of computing devices. Moreover, while it is possible that the entirety of the processing system 900 shown in FIG. 26 is implemented within downhole apparatus described above, one or more components or functions of the processing system 900 may also or instead be implemented in wellsite surface equipment, and/or other surface or downhole equipment.

The processing system 900 may comprise a processor 912, such as a general-purpose programmable processor, for example. The processor 912 may comprise a local memory 914, and may execute program code instructions 932 present in the local memory 914 and/or another memory device. The processor 912 may execute, among other things, machine-readable instructions or programs to implement the methods and/or processes described herein. The programs stored in the local memory 914 may include program instructions or computer program code that, when executed by an associated processor, cause a controller and/or control system implemented in surface equipment and/or a downhole tool to perform tasks as described herein. The processor 912 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 912 may be in communication with a main memory 917, such as via a bus 922 and/or other communication means. The main memory 917 may comprise a volatile memory 918 and a non-volatile memory 920. The volatile memory 918 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 920 may be, comprise, or be implemented by read-only memory, flash memory, and/or other types of memory devices. One or more memory controllers (not shown) may control access to the volatile memory 918 and/or the non-volatile memory 920.

The processing system 900 may also comprise an interface circuit 924. The interface circuit 924 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 924 may also comprise a graphics driver card. The interface circuit 924 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 926 may be connected to the interface circuit 924. One or more of the input devices 926 may permit a user to enter data and/or commands for utilization by the processor 912. Each input device 926 may be, comprise, or be implemented by a keyboard, a mouse, a touchscreen, a track-pad, a trackball, an image/code scanner, and/or a voice recognition system, among other examples.

One or more output devices 928 may also be connected to the interface circuit 924. One or more of the output devices 928 may be, comprise, or be implemented by a display device, such as a liquid crystal display (LCD), a light-emitting diode (LED) display, a plasma display, and/or a cathode ray tube (CRT) display, among other examples. One or more of the output devices 928 may also or instead be, comprise, or be implemented by a printer, speaker, and/or other examples.

The processing system 900 may also comprise a mass storage device 930 for storing machine-readable instructions and data. The mass storage device 930 may be connected to the interface circuit 924, such as via the bus 922. The mass storage device 930 may be or comprise a floppy disk drive, a hard disk drive, a compact disk (CD) drive, a flash drive, and/or digital versatile disk (DVD) drive, among other examples. The program code instructions 932 may be stored in the mass storage device 930, the volatile memory 918, the non-volatile memory 920, the local memory 914, and/or on a removable storage medium 934, such as a CD, DVD, or flash drive.

The mass storage device 930, the volatile memory 918, the non-volatile memory 920, the local memory 914, and/or the removable storage medium 934 may each be a tangible, non-transitory storage medium. The modules and/or other components of the processing system 900 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the claims and the figures, a person having ordinary skill in the art will readily recognize that the present disclosure introduces a method comprising: extracting an echo from an ultrasonic waveform, wherein the waveform was acquired utilizing a downhole ultrasonic tool having an acoustic device and operated within a wellbore extending into a subterranean formation; determining for the ultrasonic waveform an energy before echo profile preceding the extracted echo; processing the energy before echo profile to remove effects associated with the acoustic device; and identifying a cutting from the processed energy before echo profile.

The method may comprise utilizing the downhole ultrasonic tool to acquire the waveform.

Extracting the echo may comprise identifying a largest peak in the waveform, and the method may comprise determining a first break associated with the largest peak. The first break may be determined based on a travel time and an empirically-determined temporal offset to the travel time. Determining the first break may comprise extrapolating a fitted portion of an envelope of the waveform to an amplitude of zero. The first break may be determined based on an entropy-based curve minimum time. Determining the energy before echo profile may comprise summing squared amplitude values of the waveform that precede the first break. Extracting the echo may comprise identifying a first one of a plurality of peaks in the waveform, the first peak may be larger than each of the other peaks, and determining the energy before echo profile may comprise: removing a ring-down noise of the acoustic device from the waveform; and identifying a second one of the peaks that is larger than each of the other peaks that precede the first break.

Processing the energy before echo profile may comprise: determining a stand-off trend associated with the acoustic device to extract the portion associated with cuttings; and subtracting the stand-off trend from the energy before echo profile. Determining the stand-off trend may comprise short-window smoothing the energy before echo profile. Determining the stand-off trend may comprise estimating the stand-off trend utilizing minima-detection. Determining the stand-off trend may comprise: generating a cross-plot of energy before echo profile versus the travel time; fitting a curve to the cross-plot; and utilizing the curve to equalize data points pertaining to a given travel time.

Identifying the cutting from the processed energy before echo profile may comprise: determining a discerning threshold for the processed energy before echo profile; and identifying a point in the processed energy before echo profile that exceeds the discerning threshold. The discerning threshold may be a median of the processed energy before echo profile. Determining the discerning threshold may comprise: determining a median of the processed energy before echo profile; and scaling the median by a predetermined value.

The method may comprise generating an ultrasonic image from data comprising the ultrasonic waveform, and generating the ultrasonic image may include accounting for the identified cutting.

The method may comprise: repeating the extracting, determining, and processing with additional ultrasonic waveforms to identify additional cuttings; and determining an answer product utilizing an estimated amount and relative size collectively indicated by the identified cutting and the identified additional cuttings.

The present disclosure also introduces a system comprising: (A) a downhole ultrasonic tool having an acoustic device and operable within a wellbore to acquire an ultrasonic waveform; and (B) a processing device comprising a processor and a memory storing an executable code, wherein the processing device is operable for: (1) extracting an echo from the acquired waveform; (2) determining for the ultrasonic waveform an energy before echo profile preceding the extracted echo; (3) processing the energy before echo profile to remove effects associated with the acoustic device; and (4) identifying a cutting from the processed energy before echo profile. The downhole ultrasonic tool may comprise at least one transducer assembly and electronics, and the at least one transducer assembly and the electronics may be collectively operable for acquiring the waveform via obtaining ultrasonic pulse-echo measurements.

The present disclosure also introduces a tangible, non-transient, computer-readable medium comprising instructions executable by a processor to: extract an echo from an ultrasonic waveform, wherein the waveform was acquired utilizing a downhole ultrasonic tool having an acoustic device and operated within a wellbore extending into a subterranean formation; determine for the ultrasonic waveform an energy before echo profile preceding the extracted echo; process the energy before echo profile to remove effects associated with the acoustic device; and identify a cutting from the processed energy before echo profile.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions, and alterations herein without departing from the scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
   acquiring a plurality of sequential ultrasonic waveforms utilizing a downhole ultrasonic tool having an acoustic device and operated within a wellbore extending into a subterranean formation, wherein the acoustic device includes firing an ultrasonic signal towards the subterranean formation at a plurality of sequential locations and receiving in response to each firing one of the plurality of ultrasonic waveforms,
   extracting an echo from at least one ultrasonic waveform of the plurality, wherein the echo is representative of a reflection of the fired ultrasonic signal,
   determining an energy before echo profile for the plurality of sequential ultrasonic waveforms, wherein the energy before echo profile is representative of the energy preceding the extracted echo of each ultrasonic waveform;
   processing the energy before echo profile to remove effects associated with the acoustic device; and
   identifying a cutting from the processed energy before echo profile.

2. The method of claim 1 wherein extracting the echo comprises identifying a largest peak in the waveform, and wherein the method further comprises determining a first break associated with the largest peak.

3. The method of claim 2 wherein the first break is determined based on a travel time and an empirically-determined temporal offset to the travel time.

4. The method of claim 2 wherein determining the first break comprises extrapolating a fitted portion of an envelope of the waveform to an amplitude of zero.

5. The method of claim 2 wherein the first break is determined based on an entropy-based curve minimum time.

6. The method of claim 2 wherein determining the energy before echo profile comprises summing squared amplitude values of the waveform that precede the first break.

7. The method of claim 2 wherein extracting the echo comprises identifying a first one of a plurality of peaks in the waveform, wherein the first peak is larger than each of the other peaks, and wherein determining the energy before echo profile comprises:
   removing a ring-down noise of the acoustic device from the waveform; and
   identifying a second one of the peaks that is larger than each of the other peaks that precede the first break.

8. The method of claim 1 wherein processing the energy before echo profile comprises:
   determining a stand-off trend associated with the acoustic device to extract the portion associated with cuttings; and
   subtracting the stand-off trend from the energy before echo profile.

9. The method of claim 8 wherein determining the stand-off trend comprises short-window smoothing the energy before echo profile.

10. The method of claim 8 wherein determining the stand-off trend comprises estimating the stand-off trend utilizing minima-detection.

11. The method of claim 8 wherein determining the stand-off trend comprises:
    generating a cross-plot of energy before echo profile versus the travel time;
    fitting a curve to the cross-plot; and
    utilizing the curve to equalize data points pertaining to a given travel time.

12. The method of claim 1 wherein identifying the cutting from the processed energy before echo profile comprises:
    determining a discerning threshold for the processed energy before echo profile; and
    identifying a point in the processed energy before echo profile that exceeds the discerning threshold.

13. The method of claim 12 wherein the discerning threshold is a median of the processed energy before echo profile.

14. The method of claim 12 wherein determining the discerning threshold comprises:
   determining a median of the processed energy before echo profile; and
   scaling the median by a predetermined value.

15. The method of claim 1 further comprising generating an ultrasonic image from data comprising attributes of the extracted echo, wherein the attributes are echo peak amplitude and travel time;
   generating the ultrasonic image includes binning the attributes accounting for the identified cutting.

16. The method of claim 1 further comprising:
   repeating the extracting, determining, and processing with additional ultrasonic waveforms to identify additional cuttings; and
   determining an answer product utilizing an estimated amount and relative size collectively indicated by the identified cutting and the identified additional cuttings.

17. A system comprising:
   a downhole ultrasonic tool having an acoustic device and operable within a wellbore extending into a subterranean formation to acquire a plurality of sequential ultrasonic waveforms, configured to fire an ultrasonic signal towards the subterranean formation at a plurality of sequential locations and to receive in response to each fired ultrasonic signal one of the plurality of ultrasonic waveforms; and
   a processing device comprising a processor and a memory storing an executable code, wherein the processing device is operable for:
      extracting an echo from at least one of the acquired waveform;
      determining for each of the plurality of sequential ultrasonic waveforms an energy before echo profile, wherein the energy before echo profile is representative of the energy preceding the extracted echo of each ultrasonic waveform;
      processing the energy before echo profile to remove effects associated with the acoustic device; and
      identifying a cutting from the processed energy before echo profile.

18. The system of claim 17 wherein the downhole ultrasonic tool comprises at least one transducer assembly and electronics, wherein the at least one transducer assembly and the electronics are collectively operable for acquiring the waveform via obtaining ultrasonic pulse-echo measurements.

19. A tangible, non-transient, computer-readable medium comprising:
   instructions executable by a processor to:
   receive a plurality of sequential ultrasonic waveforms acquired utilizing a downhole ultrasonic tool having an acoustic device and operated within a wellbore extending into a subterranean formation, wherein the plurality of sequential ultrasonic waveforms are acquired at sequential locations within the wellbore,
   extract an echo from at least and insert one of the plurality of ultrasonic waveforms, wherein the echo is representative of a reflection of the fired ultrasonic signal
   determine for the ultrasonic waveform an energy before echo profile for the plurality of sequential ultrasonic waveforms an energy before echo profile, wherein the energy before echo profile is representative of the energy preceding the extracted echo of each ultrasonic waveform;
   process the energy before echo profile to remove effects associated with the acoustic device; and
   identify a cutting from the processed energy before echo profile.

* * * * *